(12) United States Patent
Miller

(10) Patent No.: US 12,023,801 B2
(45) Date of Patent: Jul. 2, 2024

(54) SUSPENDED AUTOMATION SYSTEM

(71) Applicant: Kenneth C. Miller, Aptos, CA (US)

(72) Inventor: Kenneth C. Miller, Aptos, CA (US)

( * ) Notice: Subject to any disclaimer, the term of this patent is extended or adjusted under 35 U.S.C. 154(b) by 932 days.

(21) Appl. No.: 17/027,849

(22) Filed: Sep. 22, 2020

(65) Prior Publication Data

US 2021/0001475 A1 Jan. 7, 2021

Related U.S. Application Data

(63) Continuation-in-part of application No. 15/528,412, filed as application No. PCT/US2015/062221 on Nov. 23, 2015, now Pat. No. 10,780,576.

(60) Provisional application No. 62/127,141, filed on Mar. 2, 2015, provisional application No. 62/102,453, filed on Jan. 12, 2015, provisional application No. 62/083,176, filed on Nov. 22, 2014.

(51) Int. Cl.
| | | |
|---|---|---|
| *B25J 5/02* | (2006.01) | |
| *B25J 9/00* | (2006.01) | |
| *B25J 13/00* | (2006.01) | |
| *B25J 19/00* | (2006.01) | |
| *B65G 1/04* | (2006.01) | |
| *B65G 1/06* | (2006.01) | |

(52) U.S. Cl.
CPC .............. *B25J 5/02* (2013.01); *B25J 9/0018* (2013.01); *B25J 13/00* (2013.01); *B25J 19/0008* (2013.01); *B65G 1/0464* (2013.01); *B65G 1/0471* (2013.01); *B65G 1/06* (2013.01); *B65G 2203/0266* (2013.01); *B65G 2203/041* (2013.01)

(58) Field of Classification Search
CPC .. B61B 3/00; B61B 3/02; B61B 10/00; B61B 10/001; B61B 13/00; B66C 7/00; B66C 7/02; B66C 7/04
See application file for complete search history.

(56) References Cited

U.S. PATENT DOCUMENTS

| 10,780,576 B2 * | 9/2020 | Miller .................... B25J 5/04 |
|---|---|---|
| 2006/0257233 A1 | 11/2006 | Bonora et al. |
| 2007/0081879 A1 | 4/2007 | Bonora et al. |
| 2008/0056864 A1 | 3/2008 | Wada et al. |

(Continued)

OTHER PUBLICATIONS

Int'l Search Report issued for PCT/US2015/062221, dated Feb. 23, 2016.
U.S. Appl. No. 15/528,412, filed May 19, 2017.

*Primary Examiner* — Robert J McCarry, Jr.
(74) *Attorney, Agent, or Firm* — MaxGoLaw PLLC

(57) ABSTRACT

A suspended automation system includes a rail array secured to a ceiling. A gantry moves in an X-Y plane defined by the rail array with a drive mechanism. A controller with a human user interface allows for selective movement of the gantry to transport, and in some instances store or manipulate articles. A motorized rotating platform and one or more of a robotic arm, a camera, or a counter-balance are added to the platform to facilitate storage and manipulation, as well as actions in the area below the ceiling. A rail array in some embodiments is equipped with storage modules located above the rail array that can take a variety of shapes, sizes, and configurations for storage of an article, including a stack. A related process of article movement can be accomplished by the suspended automation system. Another related process is overhead storage and selective delivery of an article.

20 Claims, 26 Drawing Sheets

(56) References Cited

U.S. PATENT DOCUMENTS

2009/0022575 A1    1/2009   Kimihiro
2013/0202392 A1    8/2013   Morimoto et al.

* cited by examiner

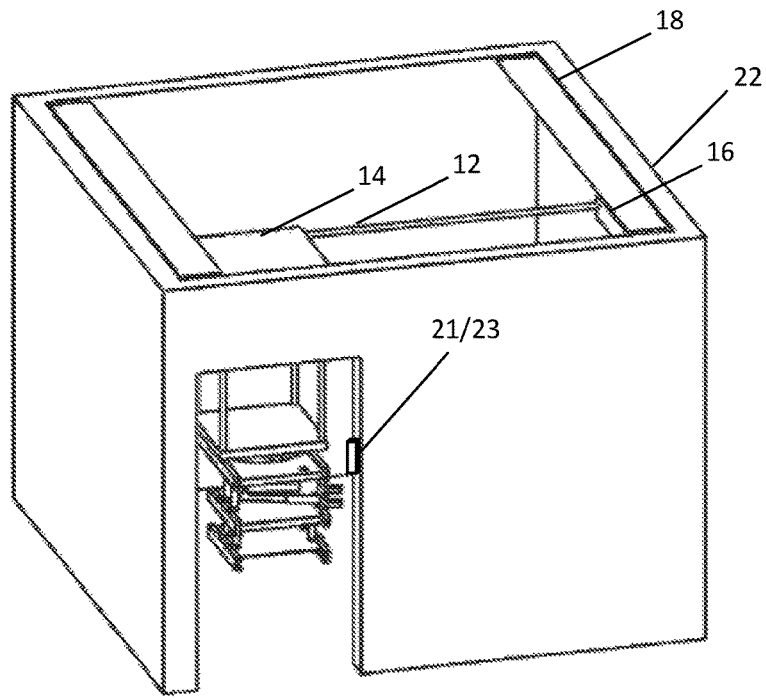
FIG. 5
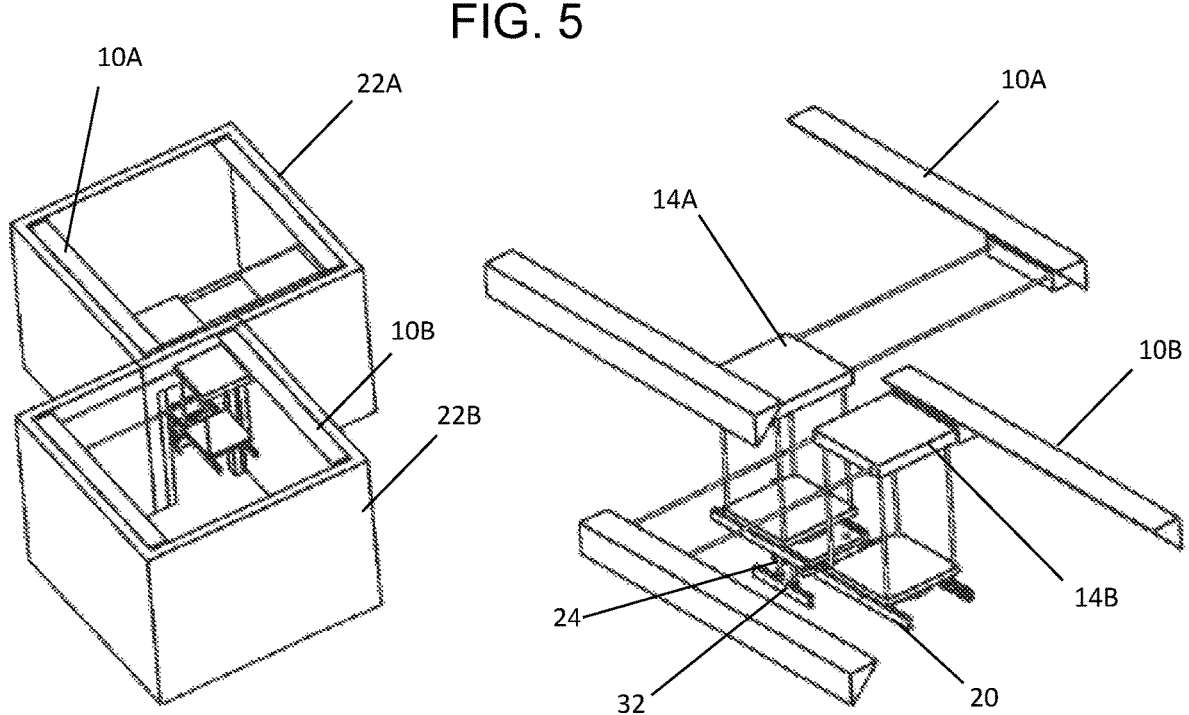
FIG. 6
FIG. 7

SUSPENDED AUTOMATION SYSTEM

CROSS REFERENCE TO RELATED APPLICATIONS

This application is a continuation-in-part of U.S. application Ser. No. 15/528,412 filed 19 May 2017 that in turn is a U.S. National Phase of PCT Application Serial Number PCT/US2015/062221 filed 23 Nov. 2015 that in turn claims priority benefit of U.S. Provisional Application Ser. No. 62/083,176 filed 22 Nov. 2014; and priority benefit of U.S. Provisional Application Ser. No. 62/102,453 filed 12 Jan. 2015; and priority benefit of U.S. Provisional Application Ser. No. 62/127,141 filed 2 Mar. 2015; the contents of which are hereby incorporated by reference.

FIELD OF THE INVENTION

The present invention in general relates to an automated system and in particular for a ceiling mounted interior space automated construction, maintenance, storage, logistics, or production system configured with robotic arms.

BACKGROUND OF THE INVENTION

Moving typical wheeled, tracked or legged robots around the interior of buildings and from room to room in order to perform household tasks such as setting tables, clearing dishes, washing dishes, putting away dishes, dusting, vacuuming, collecting clothing, washing clothing, cooking, painting, sanding, general maintenance, etc. requires that the robots to be capable of moving around on the floor which may have many obstacles such as thresholds, carpets, steps, stairs, toys, rugs, people, pets, tables, chairs, furniture, etc. that could interfere with the robot's ability to navigate the space. There is also a problem with current robotic systems of not being able to reach above, over and around lamps, furniture, etc. as well as accessing the ceiling. In addition, there is no method for robots to easily transport bins, trays, vacuum systems, washing systems, etc. from room to room in a building while simultaneously performing the aforementioned tasks. There is no current means to provide power to home robotic systems without the use of on-board batteries or cords/tethers. There is currently no solution for ceiling mounted automation systems to move robots from room to room due to the header above doorways.

Additionally, as population densities increase globally, living spaces are expected to shrink. Much of the required space in a living setting is devoted to storage of articles. The ability to access articles and appliances without having devoted floor space for such storage would greatly facilitate shrinking personal living space.

Furthermore, as the use of drone technology becomes more widespread, new uses for drones are being developed. By way of non-limiting example, in the commercial sector companies are exploring the use of drones to deliver mail, food, and medical supplies to homes. A variety of factors make such use of drone technology difficult if not impossible. Various home designs often make access to the front porch or other safe delivery point via drone difficult or impossible. Drones are unable to access interior portions of many apartment buildings thereby precluding front-door delivery. In the case of medicine delivery, even if a front porch or other safe delivery point is accessible, delivering medication in such an unsecured fashion is not ideal for a many reasons including an increased risk of theft. The ability to securely deliver articles to an area of a building more easily accessible to a drone, for example a receptacle on rooftop also accessible via the interior of the building, would greatly facilitate the effective use of drones in streams of commerce.

Thus, there exists a need for an improved robotic automation systems for covered and interior spaces. There also exists a need for such a system to store, retrieve and manipulate articles in the interior space without devoted floor space usage.

SUMMARY OF THE INVENTION

A suspended automation system includes a rail array secured to a ceiling. A gantry moves in an X-Y plane defined by the rail array with a drive mechanism. A controller with a human user interface allows for selective movement of the gantry to transport, and in some instances store or manipulate articles. A human user interface can be a display, touch screen tablet, auditory, smart phone, or a joystick.

A motorized rotating platform and one or more multiple degree of freedom robotic arms, one or more cameras, or one or more motorized counter-balances are added to the platform to facilitate storage and manipulation, as well as actions with the area below the ceiling. A rail array in some embodiments is equipped with storage modules located above the rail array, the storage modules can take a variety of shapes, sizes, and configurations for storage of an article, including in some embodiments a stack of storage modules. The article is lowered and transported from the storage module by the gantry to the platform.

A related process is also provided that includes actions and article transport. Construction of walls or objects under the ceiling, painting, cleaning, and food preparation are some of the tasks that can be accomplished by the suspended automation system. Still another related process is overhead storage and selective delivery of an article. The article is amenable to manipulation in transit to a user selected delivery point through the actions of one or robotic arms, equipped with variable tools.

BRIEF DESCRIPTION OF THE DRAWINGS

The present invention is further detailed with respect to the following figures that depict various aspects of the present invention.

FIG. 5 illustrates the wire supported X-Y-Z gantry system configured with the additional platforms of FIG. 4B mounted in a room or a walled enclosure in accordance with embodiments of the invention;

FIG. 6 illustrates adjoining rooms or enclosures with separate X-Y-Z gantry systems in accordance with embodiments of the invention;

FIG. 7 illustrates the transfer between the adjoined rooms of FIG. 6 with the alignment of the extension rails in accordance with embodiments of the invention;

FIG. 22B is a magnified view of platform drive wheels relative to the rail defining a storage module of FIG. 22A;

DESCRIPTION OF THE INVENTION

The present invention has utility as a ceiling mounted automated construction, maintenance, storage, warehousing logistics, or production system for a covered or interior space configured with robotic arms. The ceiling defining a portion of an interior room or a trellis that is either indoors or outdoors. Through resort to innovative support systems including an overhead gantry system, cables, or an X-Y rail grid, a suspended platform is traversed throughout the system area.

Figure 1:
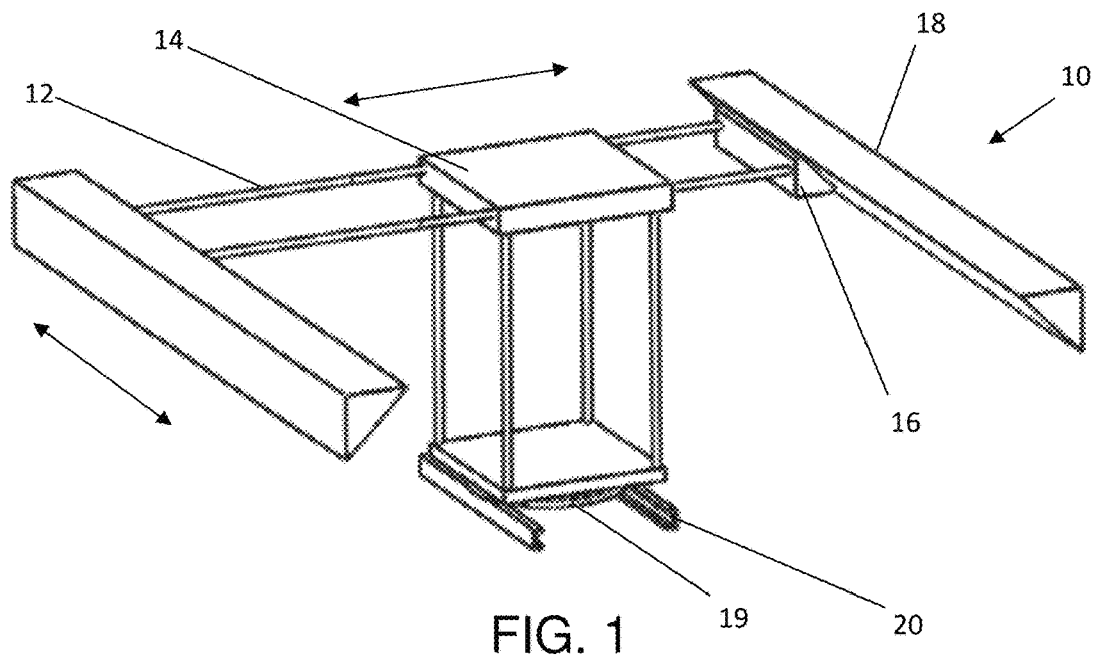
FIG. 1 illustrates a wire supported X-Y-Z gantry system in accordance with embodiments of the invention.

Referring now to the figures, in a first inventive embodiment, an over-head X-Y-Z gantry system 10 is shown in FIG. 1 as a wire 12 supported gantry 14. The wires 12 are attached on opposing sides to slides 16 that ride on side rails 18. As indicated by the bidirectional arrows, the gantry cars 14 move from side to side along the support wires 12, and back and forth from front to back via the slides 16, thereby providing a full set of movement in the x-y plane. Power may be supplied to the gantry cars 14 through the support wire 12. Gantry 14 may be used to support almost any electronic equipment; illustratively including lights, stereo components, speakers, smoke detectors, security systems, laser systems, modems, routers, computers, and combinations thereof.

Figure 2:
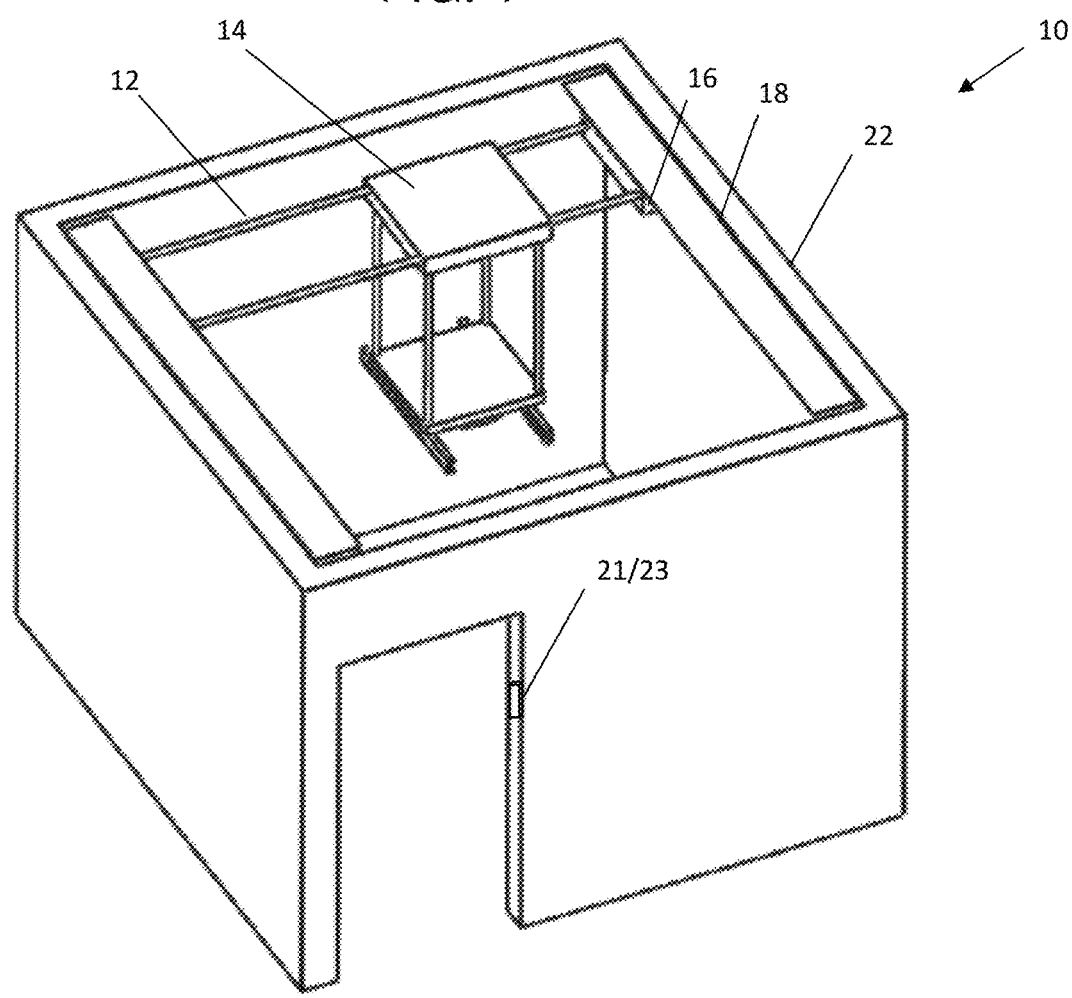
FIG. 2 illustrate the wire supported X-Y-Z gantry system of FIG. 1 mounted in a room or a walled enclosure in accordance with embodiments of the invention.

FIG. 2 illustrates a room or enclosure 22 outfitted with the X-Y-Z gantry system 10 that carries a rotating platform capable to reach most any point in the volume of the room—wall to wall and floor to ceiling where like numeral have the meaning ascribed to thereto with respect to the aforementioned drawing. Extension rails 20 on the gantry cars 14 extend out to mate with corresponding rails on other gantry 14 in other rooms. The extension rails 20 are mounted to a swivel plate 19 that provides for a complete rotation of the extension rails 20 and anything attached to the extension rails 20. A controller 21 includes a computer system provides a human user interface 23 that is a display, touch screen tablet, auditory, smart phone, or a joystick receives user input as to the desired articles from storage, the location of delivery and the scheduling of delivery. The controller 21 then instructs the movement of the gantry system 10 to retrieve or store articles. The controller 21 also provides manipulation instructions to the robotic module 24 as to desired actions. Exemplary actions include room construction, painting, sweeping the floor, and cleaning the room. Each robotic arm contains an interface at the distal end for a variety of interchangeable motorized tools (graspers, hands, drills, suction cups, etc.). Each arm supplies electrical power to the various tools. Sensors are routinely associated with a robotic arm, as is conventional to the art, to provide telemetry, grasp strength, and article manipulation feedback data to a controller 21 or a human user of the controller 21 via the human interface 23.

Figure 3A:
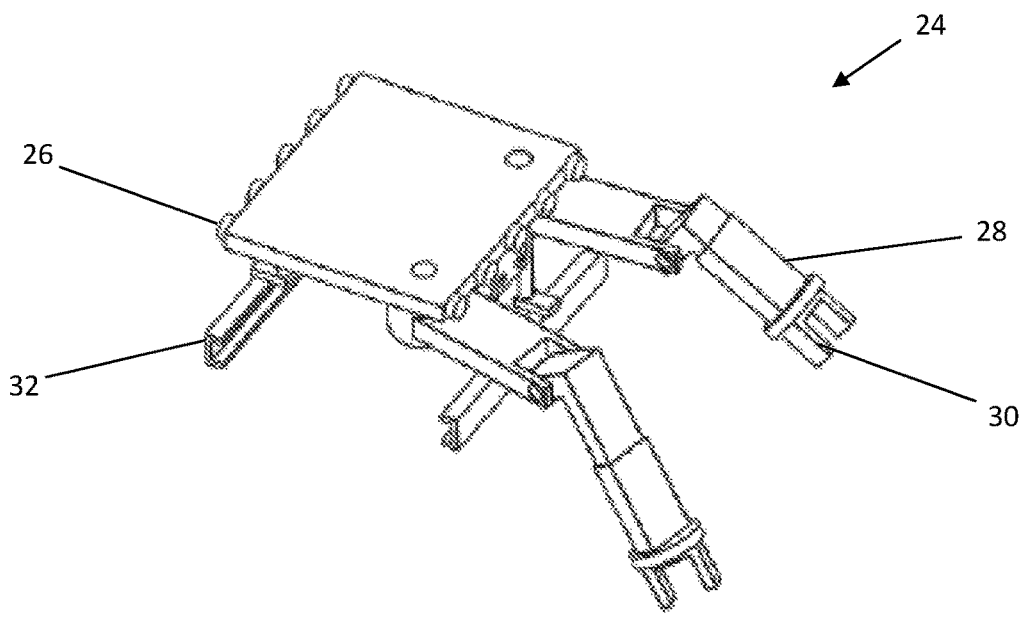
FIGS. 3A-3C illustrate a series of perspective views of motorized robotic modules for use with the X-Y-Z gantry system of FIG. 1 in accordance with embodiments of the invention.
Figure 3B:
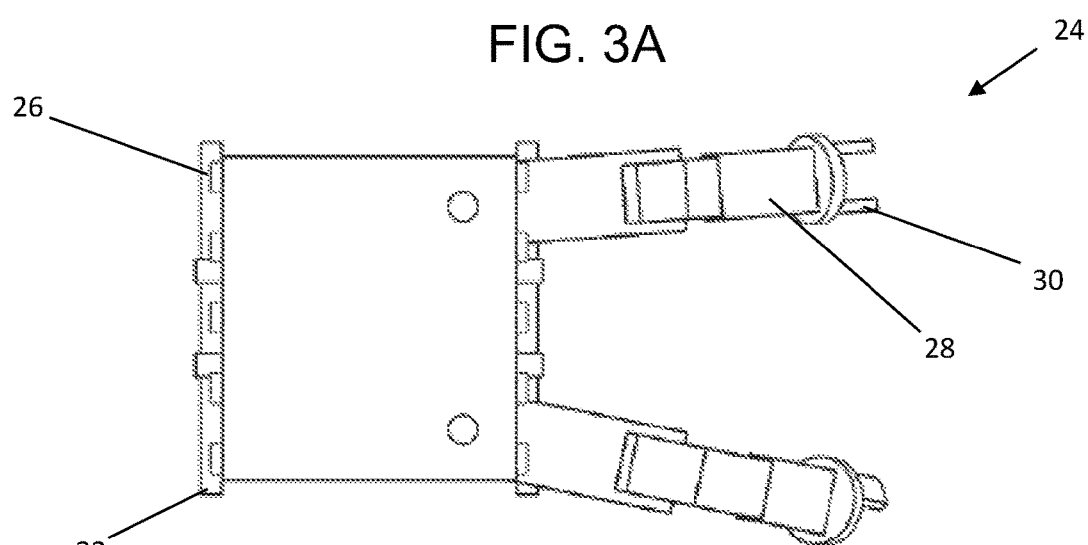
Figure 3C:
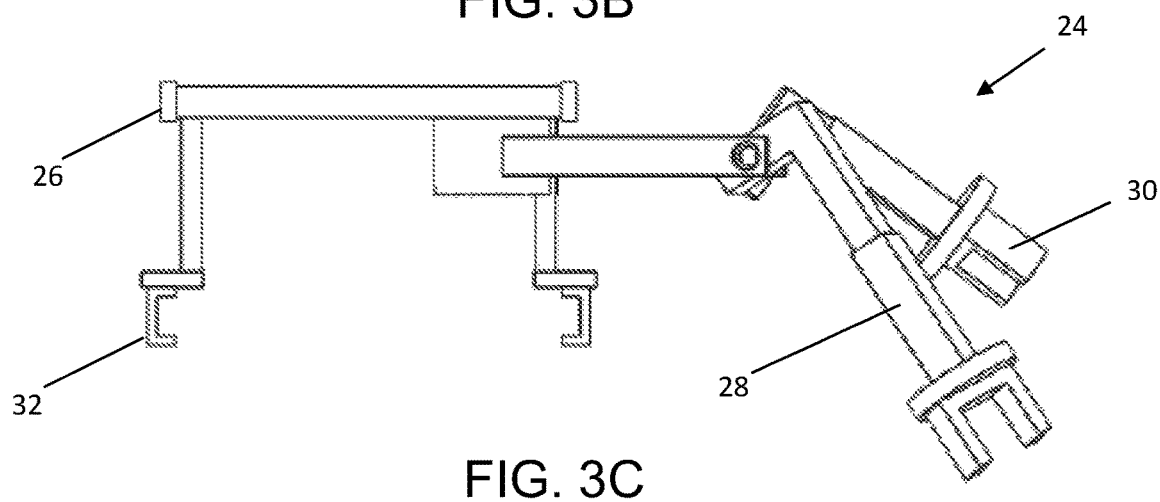

FIGS. 3A-3C illustrate motorized robotic modules 24 that ride and travel on the extension rails 20 from one room to the other (after corresponding gantry cars have been aligned with extension rails extended). The robotic module 24 are equipped with inline wheels 26 that ride on the extension rails 20, as well as one or more manipulating arms 28 with terminations 30 designed to accommodate various grabbing attachments and tools. The manipulating arms 28 typically have a shoulder, elbow, and wrist to provide a wide range of motion with interchangeable hands, grippers, and tools. The robotic module 24 folds to minimize volume, and is capable of being remotely controlled by human or computer based operators. In specific embodiments the robotic module 24 may be configured with an auxiliary set of rails 32 to support a second robotic module or platform below the first robotic module (extendable to other platforms or modules). Robotic modules 24 may additionally contain; one or more cameras, vacuum cleaner systems, dishwashing systems, floor washing systems, carpet cleaning systems, toilet cleaning systems, dusting systems, painting systems, maintenance systems, construction systems, tool kits, baskets, trays, bins, etc. Embodiments of the robotic modules 24 configured with a vacuum cleaning system may include related tools and equipment illustratively including filters, collection bins, one or more retractable hoses, attachments (nozzles, motorized brushes, etc.). Embodiments of the robotic modules 24 configured with dish cleaning capabilities may include features such as a water collector from faucet (supply), a water heater, a water pressurizer and sensor, an air compressor, a retractable hose (one or more), tools (brushes, nozzles, etc.), and a wet vacuum. Embodiments of the robotic modules 24 configured with wet cleaning system (for floors, bathrooms, carpets, etc.) may include a water collector from faucet (supply), a water heater, a water pressurizer and sensor, an air compressor, a retractable hose (one or more), tools (brushes, nozzles, etc.), and a wet vacuum. Embodiments of the robotic modules 24 configured with a painting system may include a paint supply, airbrush, airless delivery, paint rollers, and paint related tools. Embodiments of the robotic modules 24 configured with a maintenance system may include hand tools, as well as, motorized tools that illustratively include drills sanders, and caulking guns. The robotic modules 24 may include a collection/delivery bin or tray that illustratively includes uses for dishes, toys, laundry, garbage, recycling, etc.

Construction applications of the robotic modules 24 may include floor laying and tile installation grouting, concrete laying, etc.

The aforementioned modular embodiments may transfer from room to room by moving along the rails (to be described in greater detail below). Modules 24 may also move from room to room by moving along the rail sets located on other modules 24. Multiple modules 24 may hang from each other under the lower platform portion of the gantry car 14, and module 24 may be transported from room to room by association with the module directly supported by the gantry car.

Translation drive options to move the gantry cars 14 and robotic modules 24 include the use of cables, linear motors, rack and pinion, screw drives, and drive wheels.

Figure 4A:
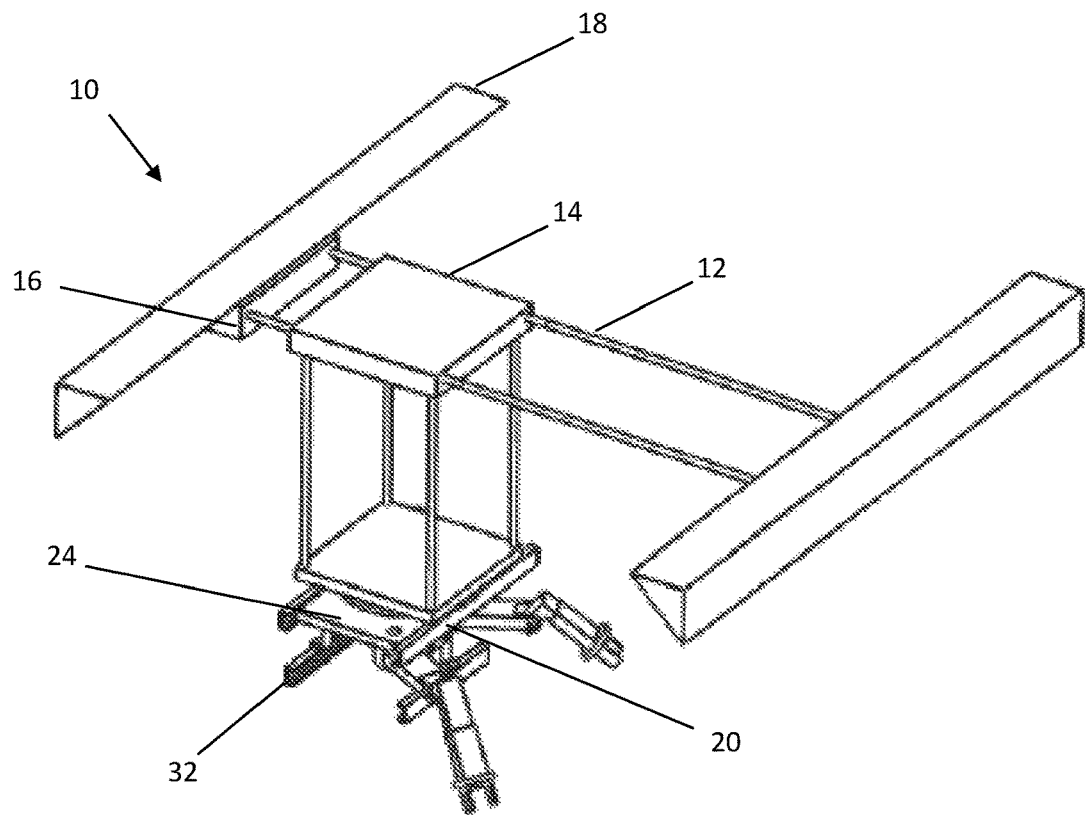
FIG. 4A illustrates a perspective view of the wire supported X-Y-Z gantry system of FIG. 1 outfitted with a motorized robotic module in accordance with embodiments of the invention.
Figure 4B:
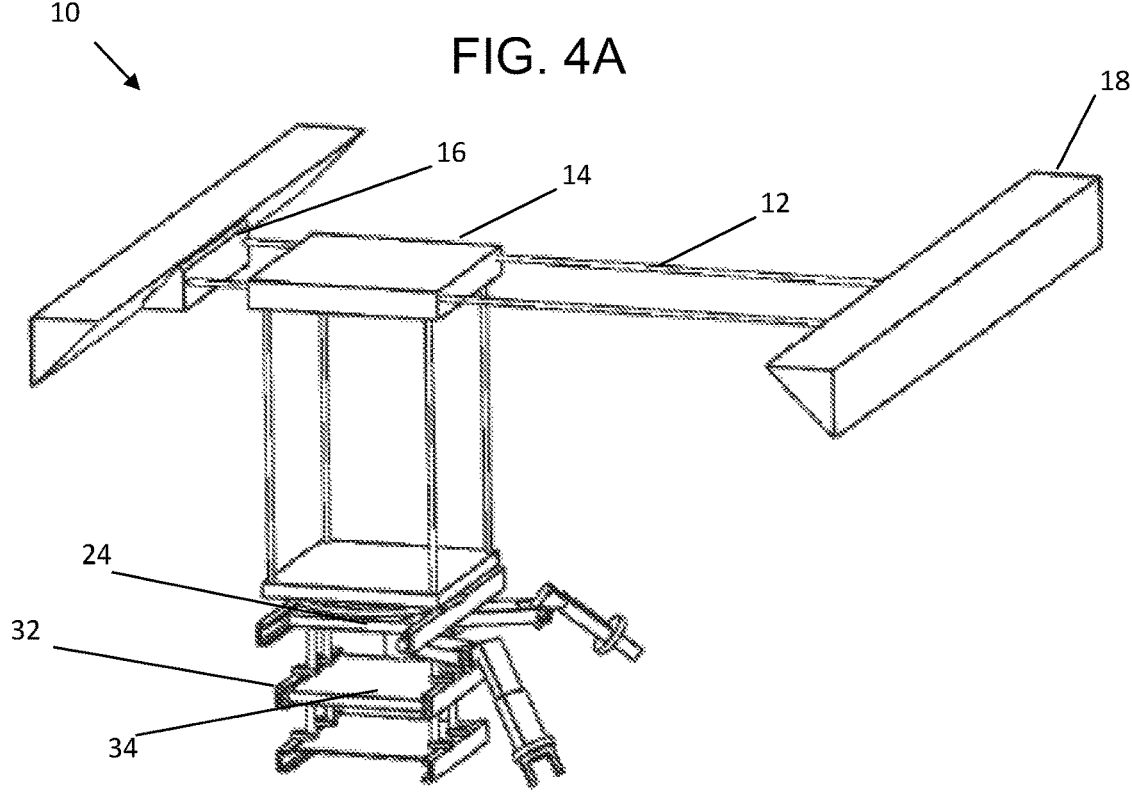
FIG. 4B illustrates a perspective view of the wire supported X-Y-Z gantry system of FIG. 1 outfitted with a motorized robotic module with additional platforms suspended from the motorized robotic module from the auxiliary rails in accordance with embodiments of the invention.

FIG. 4A illustrates a perspective view of the wire supported X-Y-Z gantry system 10 of FIG. 1 outfitted with a motorized robotic module 24 where like numeral have the meaning ascribed to thereto with respect to the aforementioned drawings. FIG. 4B illustrates a perspective view of the wire supported X-Y-Z gantry system 10 outfitted with a motorized robotic module 24 with additional platforms 34 suspended from the motorized robotic module 24 from the auxiliary rails 32 where like numeral have the meaning ascribed to thereto with respect to the aforementioned drawings. FIG. 5 illustrates the wire supported X-Y-Z gantry system 10 configured with the additional platforms 34 of FIG. 4B mounted in a room or a walled enclosure 22 where like numeral have the meaning ascribed to thereto with respect to the aforementioned drawings.

Figure 8:
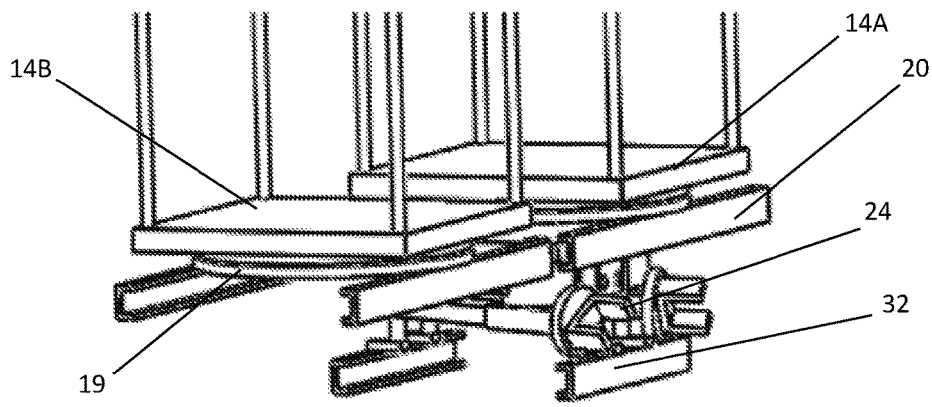
FIG. 8 is a perspective view of the supported platforms and the alignment of the extension rails for transfer of the motorized robotic module in accordance with embodiments of the invention.
Figure 9A:
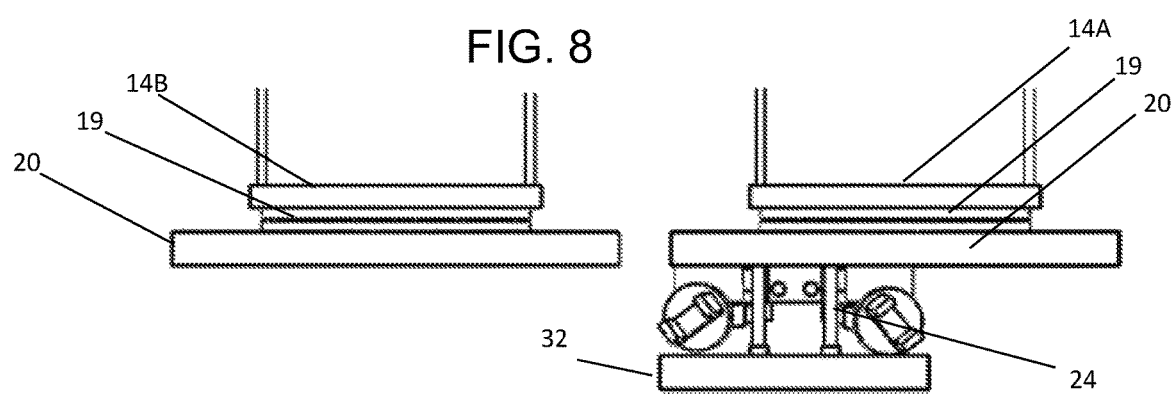
FIGS. 9A-9C illustrate the progress of the transferring of the motorized robotic module between wire supported X-Y-Z gantry systems of adjoining rooms or enclosures in accordance with embodiments of the invention.
Figure 9B:
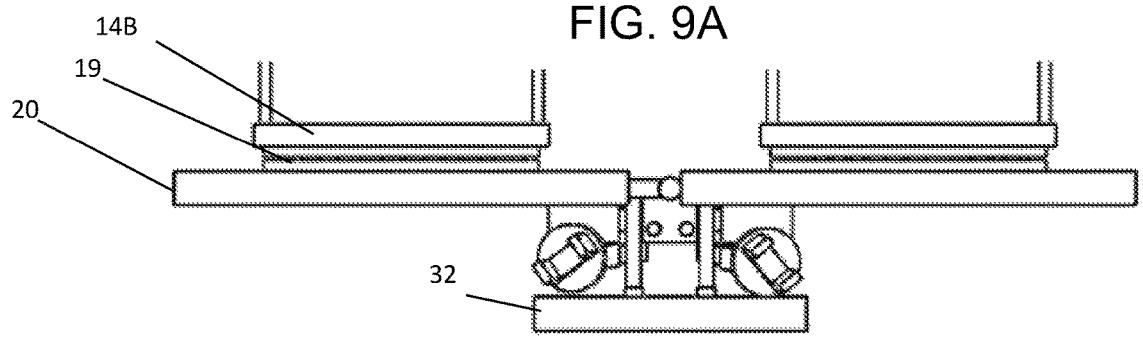
Figure 9C:
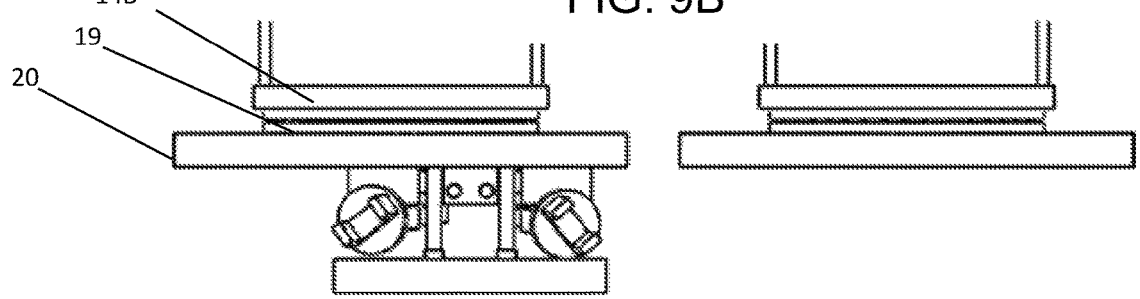

FIG. 6 illustrates adjoining rooms or enclosures (22A, 22B) with separate X-Y-Z gantry systems (10A, 10B) where like numeral have the meaning ascribed to thereto with respect to the aforementioned drawings. FIG. 7 illustrates the transfer of motorized robotic module 24 between the adjoined rooms (22A, 22B) of FIG. 6 with the alignment of the extension rails 20 where like numeral have the meaning ascribed to thereto with respect to the aforementioned drawings. FIG. 8 is a perspective view of the gantry cars (14A, 14B) and the alignment of the extension rails 20 for transfer of the motorized robotic module 24 where like numeral have the meaning ascribed to thereto with respect to the aforementioned drawings. FIGS. 9A-9C illustrate the progress of the transferring of the motorized robotic module 24 between wire supported X-Y-Z gantry systems (10A, 10B) of adjoining rooms or enclosures (22A, 22B) via the alignment of the extension rails 20 of gantry cars (14A, 14B) where like numeral have the meaning ascribed to thereto with respect to the aforementioned drawings. It is noted that in a specific inventive embodiment, instead of the rails 20 extending to enable robotic modules 24 to pass from one gantry system to the next, the robotic modules 24 could be capable of bridging the gap themselves.

Figure 13:
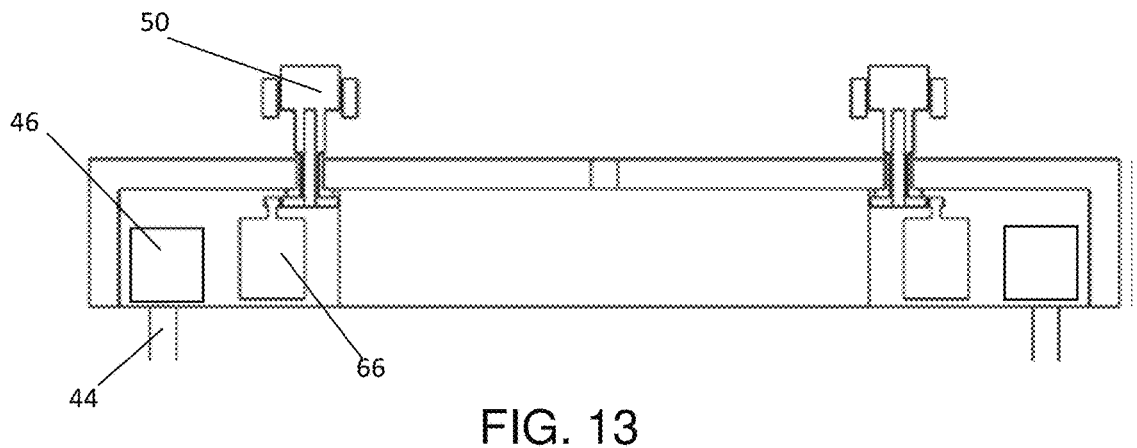
FIG. 13 is a side cut away view of a gantry showing the actuator motor for turning the drive wheel modules and the motorized winches that drive the cables up and down in accordance with embodiments of the invention.
Figures 14A, 14B, 14C:
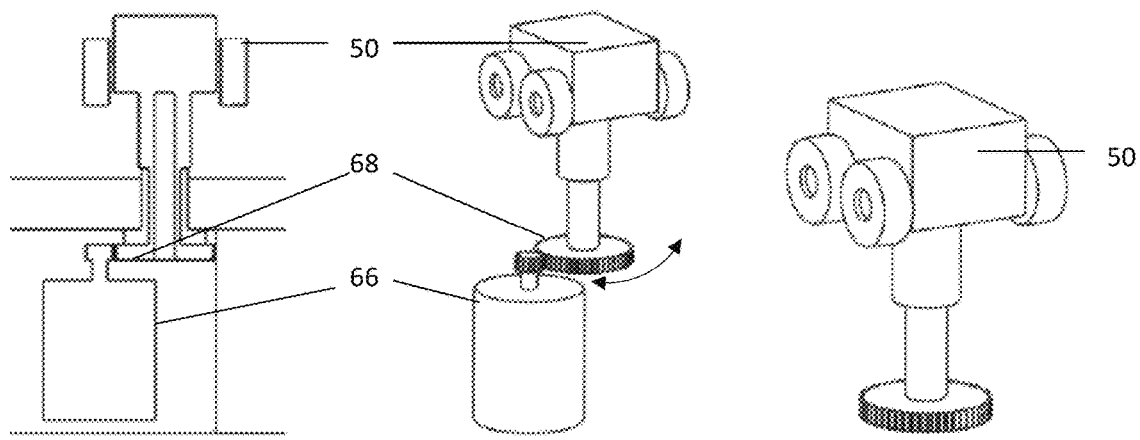
FIGS. 14A-14C are a detail views of the actuator motor and gear train for turning the drive wheel modules in accordance with embodiments of the invention.
Figure 15:
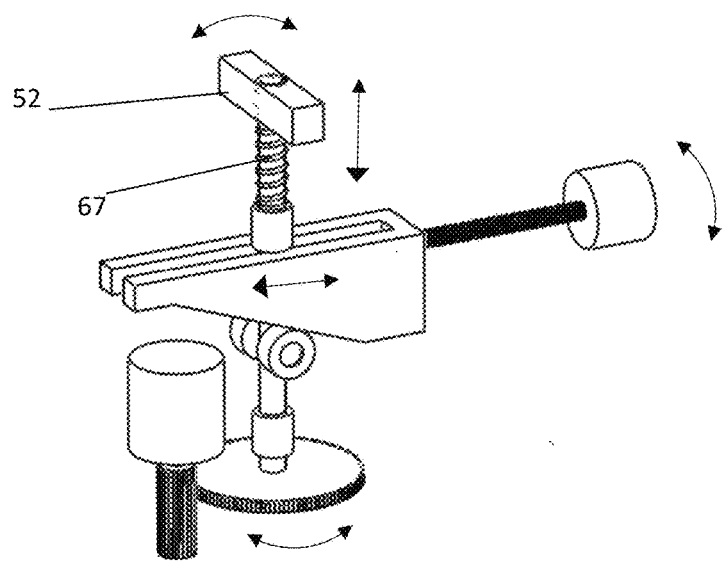
FIG. 15 is a perspective view of the lift bar show the gears, cam and rollers that drive the up and down and turning action of the lift bars in accordance with embodiments of the invention.
Figure 17A:
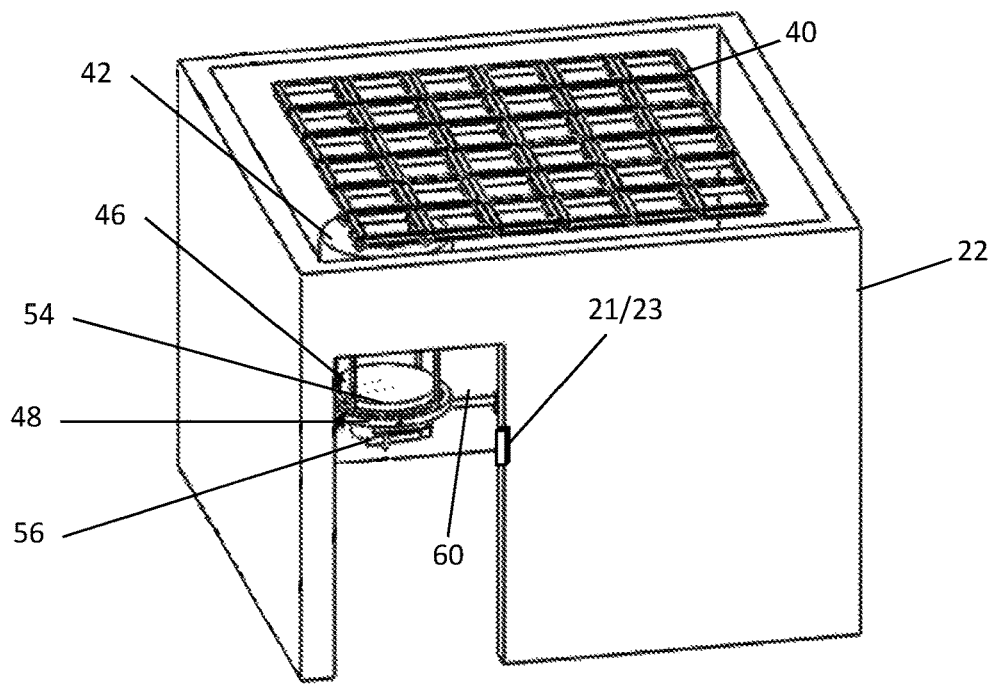
FIGS. 17A and 17B illustrate a ceiling mounted X-Y rail systems in a room or enclosure in accordance with embodiments of the invention, with the magnified view of FIG. 17B showing platform C supporting one or more multiple degree of freedom (DOF) robotic arms, one or more cameras, and counter balance in accordance with embodiments of the invention.
Figure 17B:
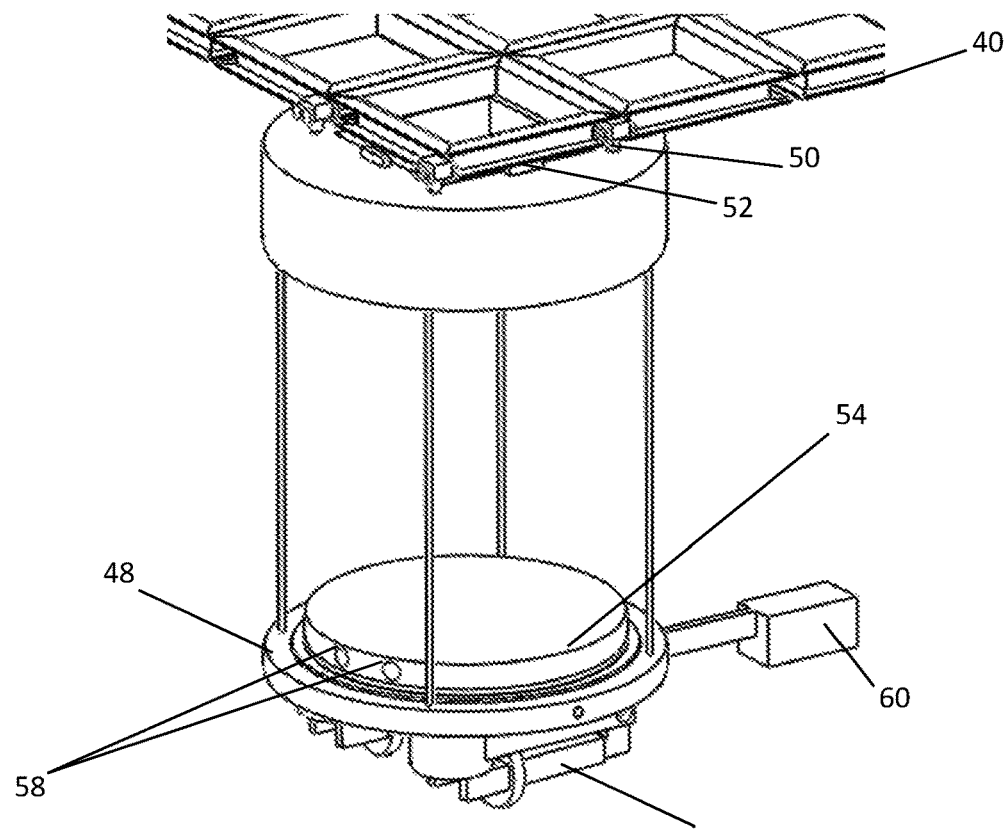
Figure 18:
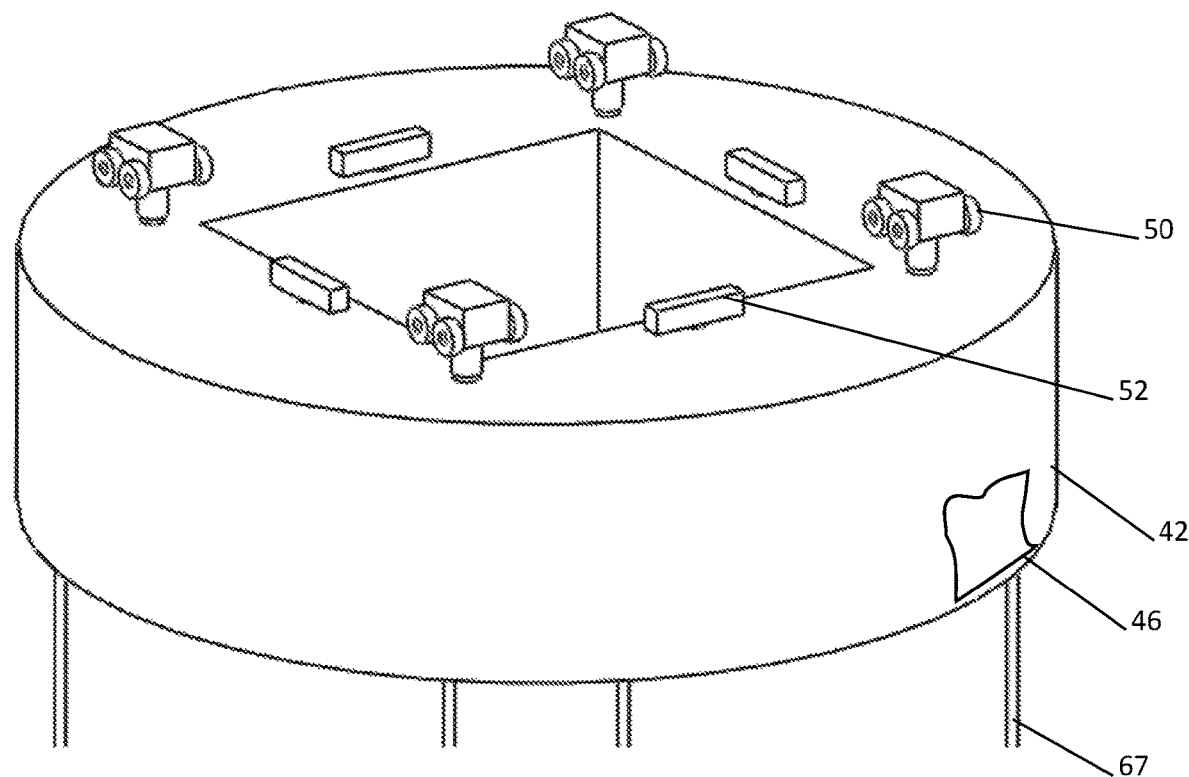
FIG. 18 is a perspective of a round version of a gantry with drive wheel modules and lift bars balance in accordance with embodiments of the invention.
Figure 19A:
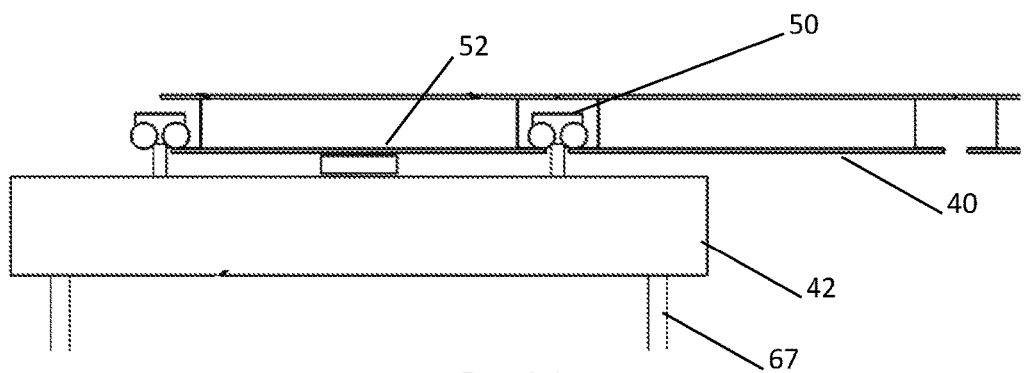
FIGS. 19A and 19B are sequential side views of a gantry of FIG. 18 engaged in the X-Y rail system in accordance with embodiments of the invention in translating in the plane of the page (FIG. 19A) and orthogonal to the plane of the page after one rail of in-plane translation (FIG. 19B)
Figure 19B:
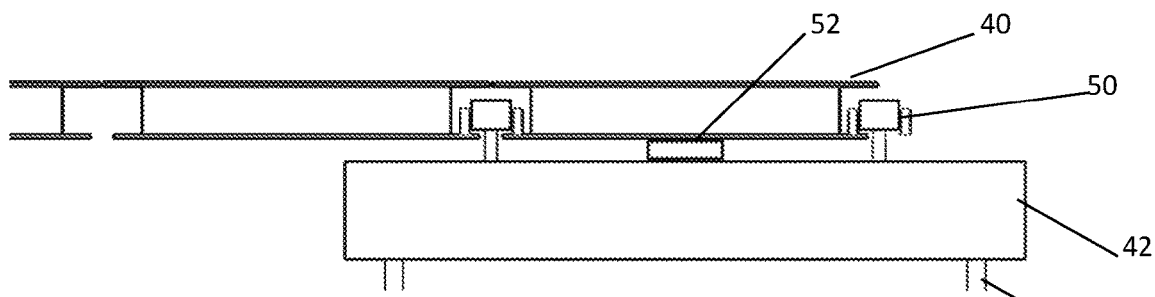
Figure 20A:
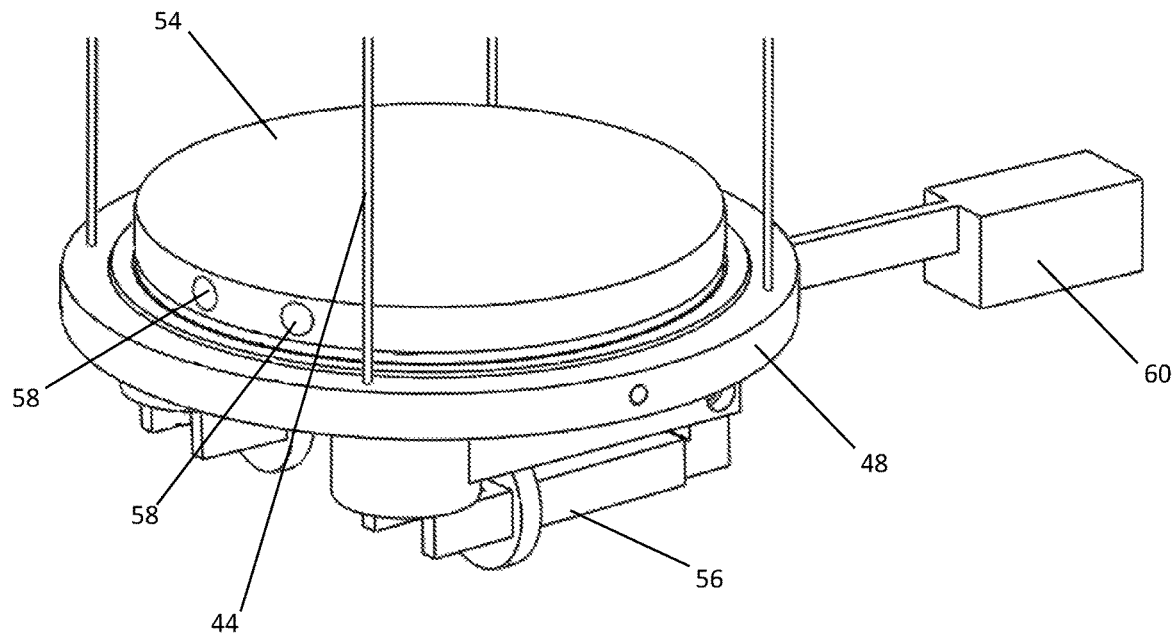
FIGS. 20A and 20B are perspective views of a platform showing the camera, counter-balance arm extended and tools with the arms shown retracted and extended, respectively in accordance with embodiments of the invention.
Figure 20B:
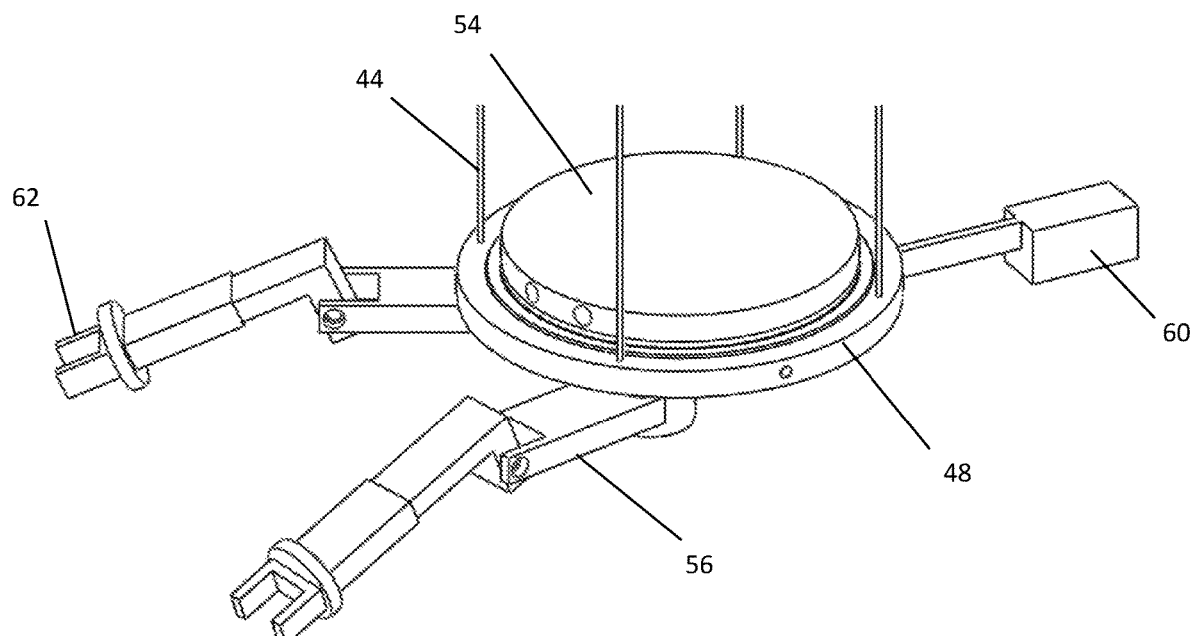

FIGS. 10A, 10B, 11A, 11B, and 12 illustrate a ceiling mounted X-Y rail system 40 in a room or enclosure 22 is provided which support a motorized gantry 42 which translates on the X-Y rails 40 where like numeral have the meaning ascribed to thereto with respect to the aforementioned drawings. The X-Y rails 40 supply electrical power to gantry 42. Gantry 42 contains three or more motorized lifts 46 (see FIG. 13) that drive cables 44 which support, raise, lower and tilt a platform B 48. It is appreciated that differential winch operation causes a suspended platform to tilt, an orientation that can promote loading and unloading thereof. Gantry 42 also contains four drive wheel modules 50 and four lifts 52 which work in concert to move gantry in X-Y directions on the X-Y rails 40. Gantry 42 supplies electrical power to platform B 48. Platform B 48 supports a motorized rotating platform C 54. Platform B 48 supplies electrical power to platform C 54. Platform C 54 supports one or more multiple degree of freedom (DOF) robotic arms 56 (see FIGS. 17B and 20B), one or more cameras 58, and may support one or more motorized counter-balance systems 60. Platform C 54 supplies electrical power to the arms 56, cameras 58, and counter-balance system 60. Each arm 56 contains an interface 62 at the distal end for interchangeable motorized tools (graspers, hands, drills, suction cups, etc.). Each arm supplies electrical power to the various tools. The arms, cameras and/or counter-balances may be attachable and detachable (automatically or manually) from a platform. A docking system between the arms, cameras and/or counter-balances; and platform enables manual or automatic mechanical attachment, and electrical. In a preferred embodiment, standard electrical/mechanical interfaces therebetween are provided so that various components from various manufacturers can be installed and function in the present invention.

In order to reduce the weight and volume of platform C 54, the counter-balance system(s) 60 may have various sized detachable weights which may be stored in a location separate from the rail system 40 or other platforms. Different weights may be used for different tasks. The weights have a common interface to the counter-balance system 60 for automatic change.

The cameras 58 may be mounted on motorized pan-tilt mechanisms with zoom capability. The arms 56 fold up for compact storage and can be tele-operated. Any of the platforms A, B, or C may contain batteries. The volume above and between the X-Y Rails may be used to contain other components: storage modules 69, lights, cameras, speakers, audio and video components, displays, smoke detectors, sensors, electronic equipment, dishwashers, vacuum cleaners, air purifying systems, air heating and cooling systems, charging stations, or a combination thereof.

Figure 10A:
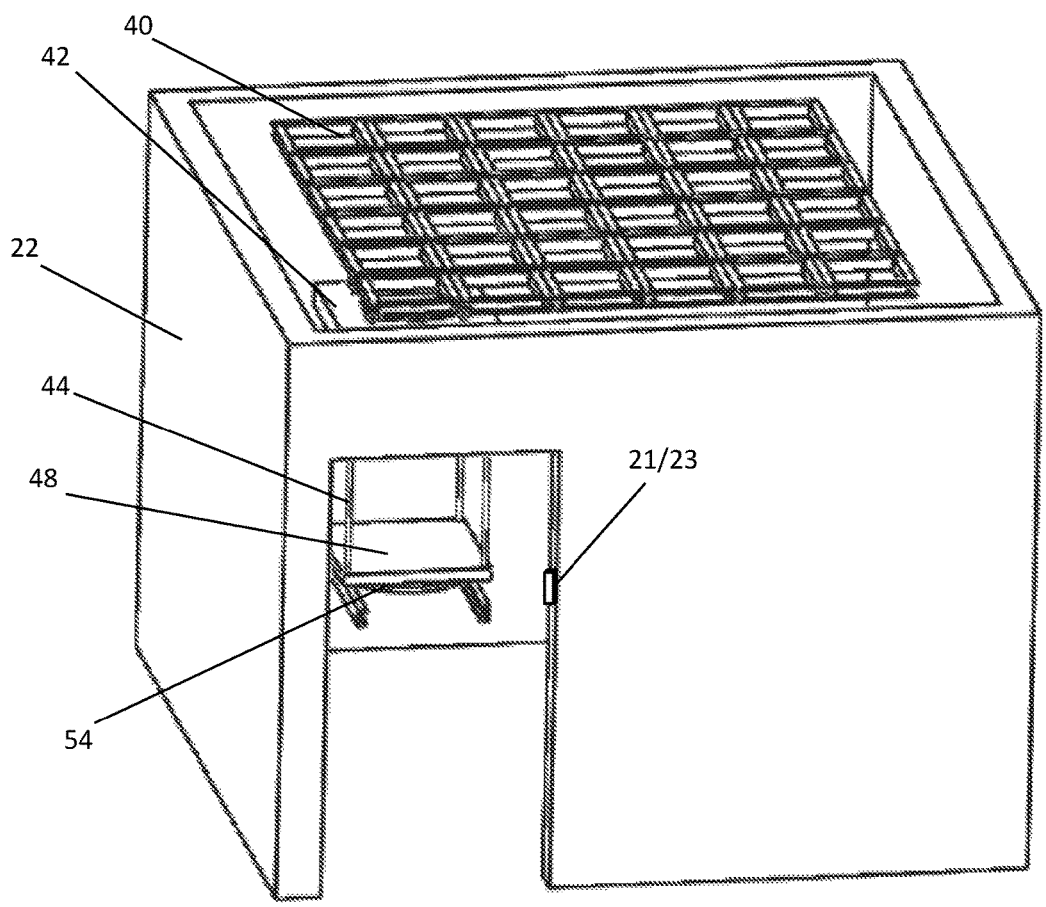
FIGS. 10A and 10B illustrate a ceiling mounted X-Y rail systems in a room or enclosure in accordance with embodiments of the invention, with a magnified view thereof illustrated in FIG. 10B.
Figure 10B:
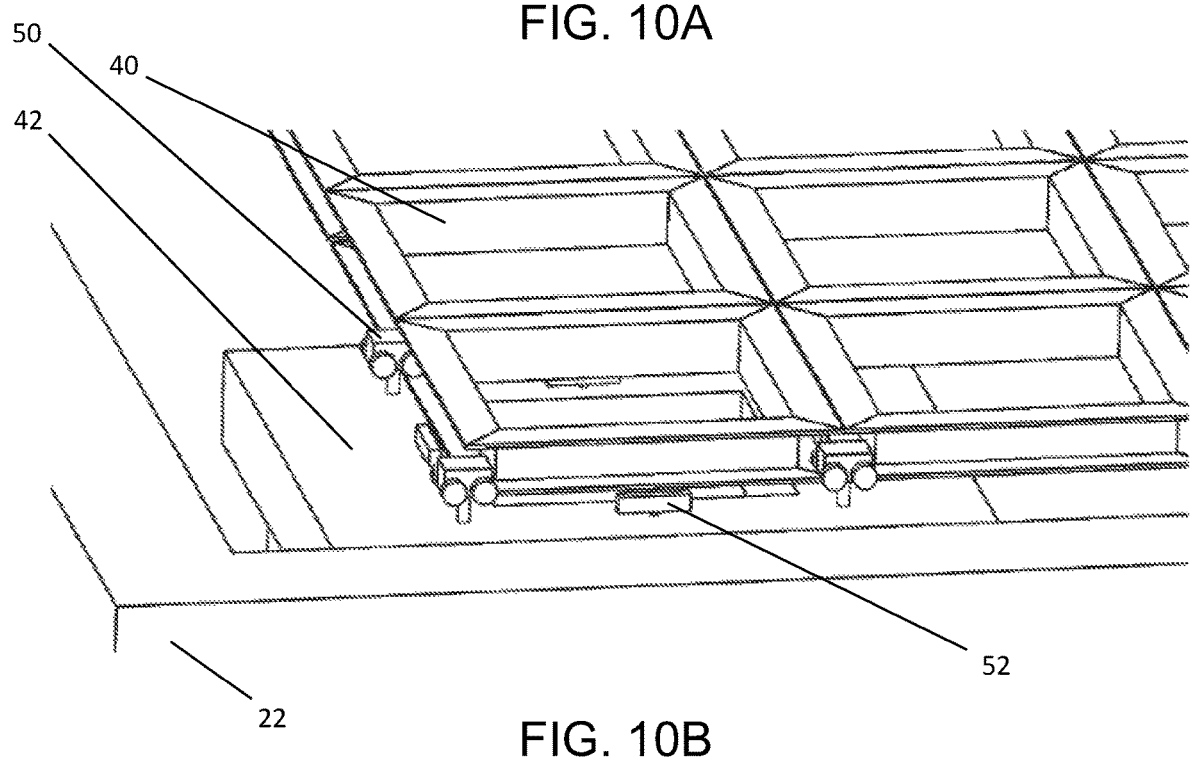
Figure 11A:
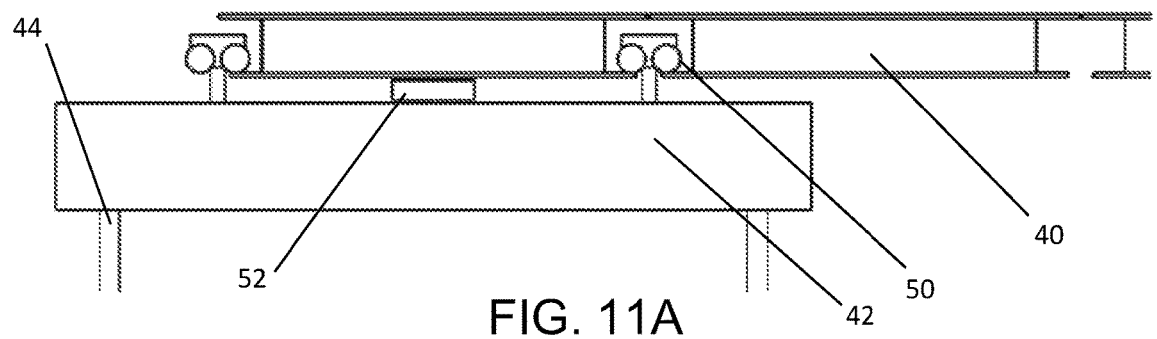
FIGS. 11A and 11B are sequential side views of a gantry engaged in the X-Y rail system in accordance with embodiments of the invention in translating in the plane of the page (FIG. 11A) and orthogonal to the plane of the page after one rail of in-plane translation (FIG. 11B)
Figure 11B:
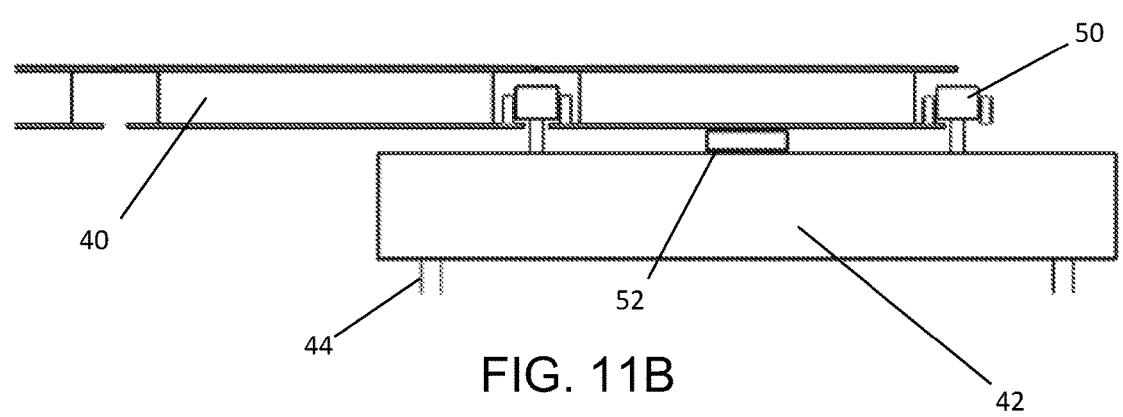
Figure 12:
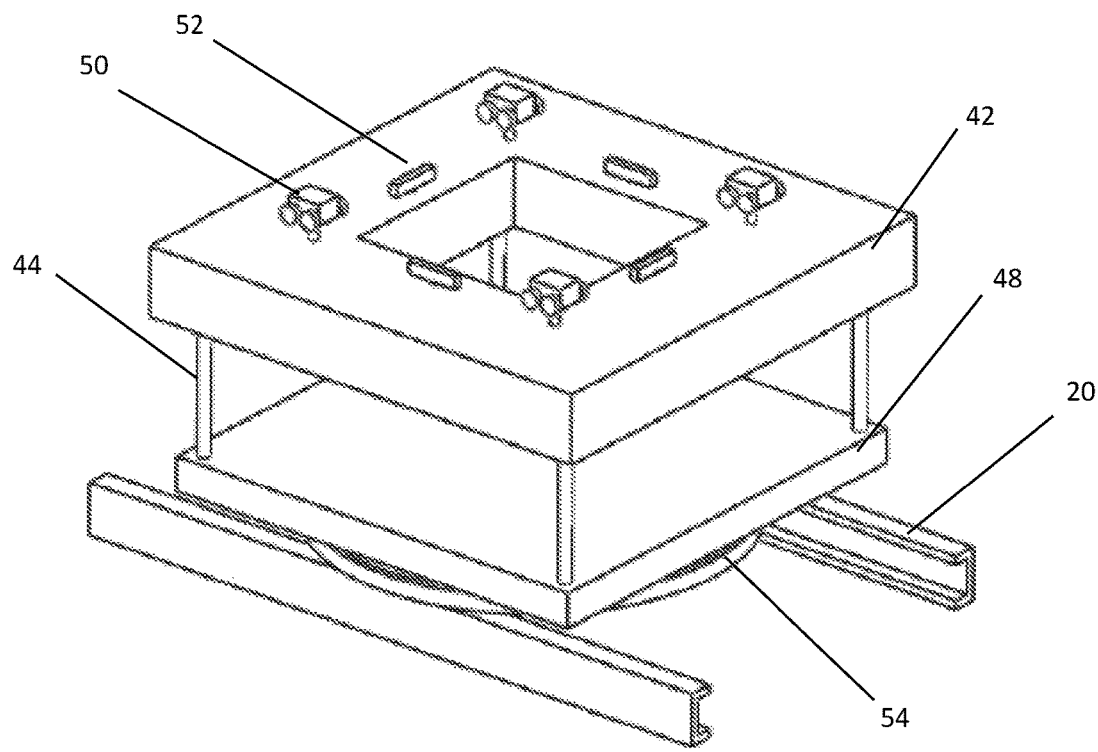
FIG. 12 is a perspective view of platforms A, B, and C with the four drive wheel modules and four lift bars shown on the upper surface of a gantry in accordance with embodiments of the invention.

FIG. 11A is a side view of the rail system positioned as shown in FIG. 10B. With a linear translation in the plane of the page by one rail and a right angle rotation of the wheel modules 50, the gantry 42 is positioned to translate orthogonal to the plane of the page in FIG. 11B. The gantry 42 is shown for clarity detached from the rail grid 40 in FIG. 12.

Figure 16A:
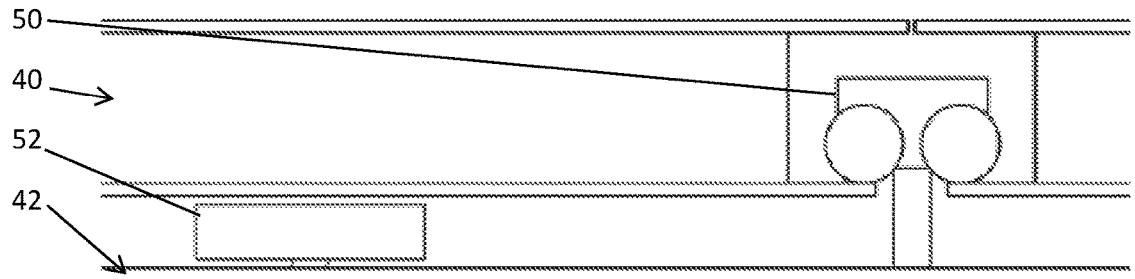
FIGS. 16A-16I are a series of sequential side views showing the X-Y rail and the actions of the lift bar and drive wheel module in accordance with embodiments of the invention.
Figure 16B:
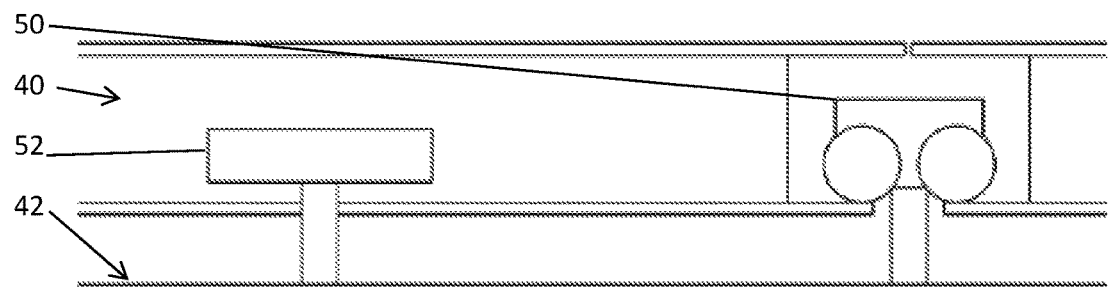
Figure 16C:
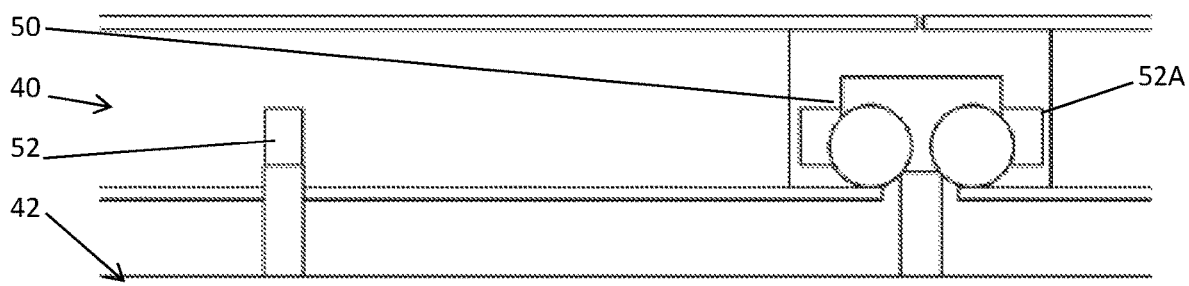
Figure 16D:
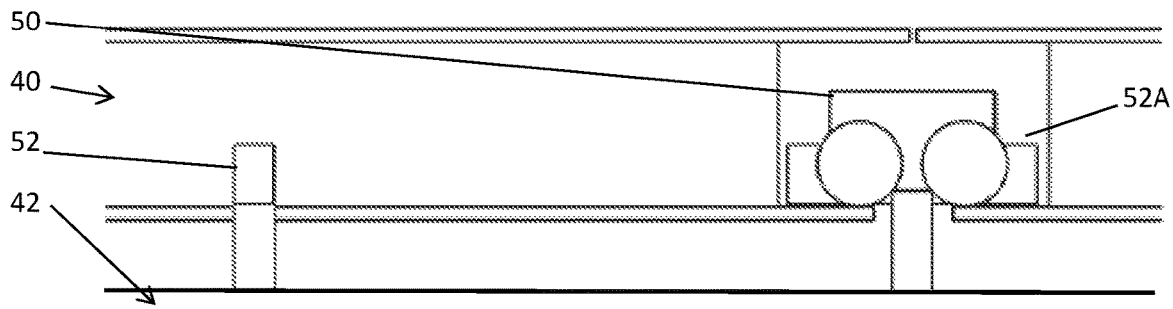
Figure 16E:
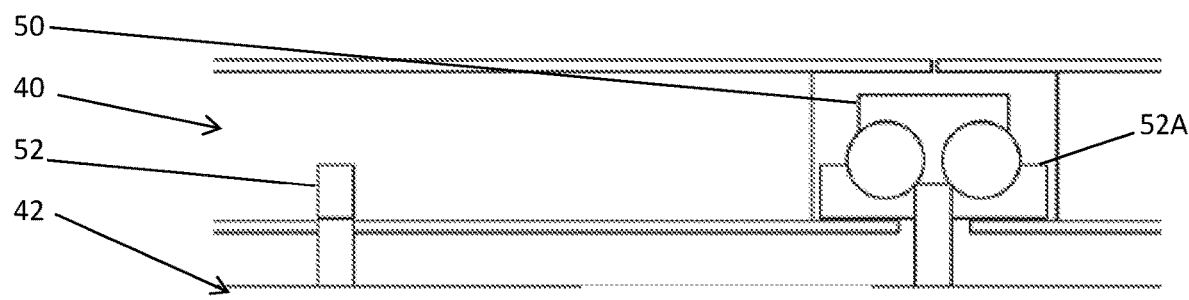
Figure 16F:
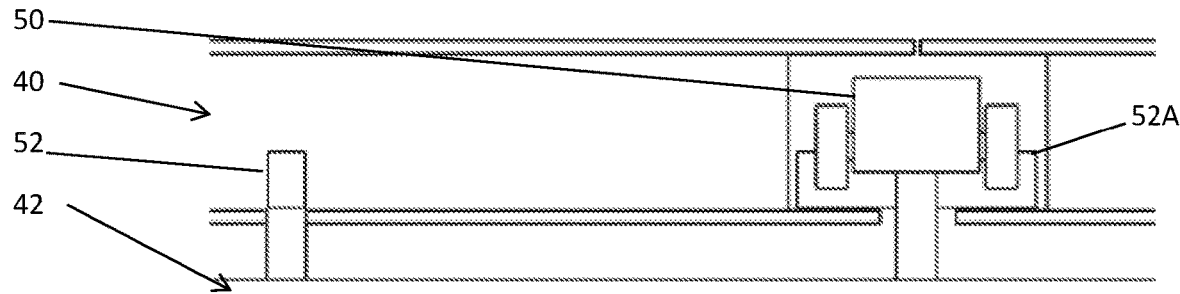
Figure 16G:
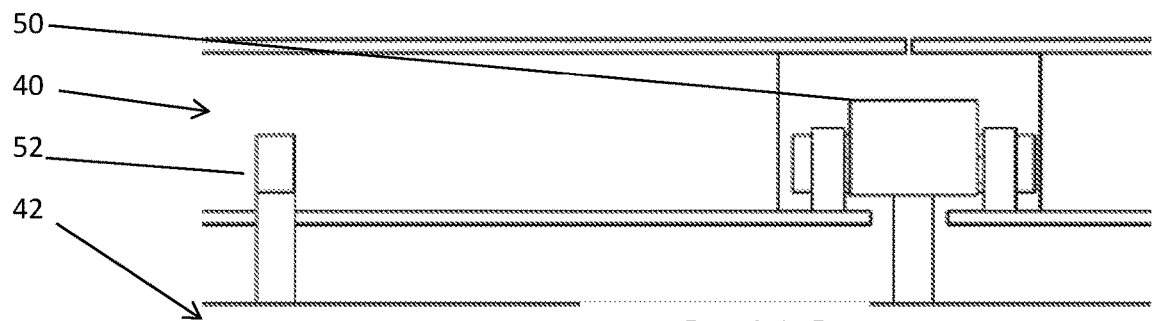
Figure 16H:
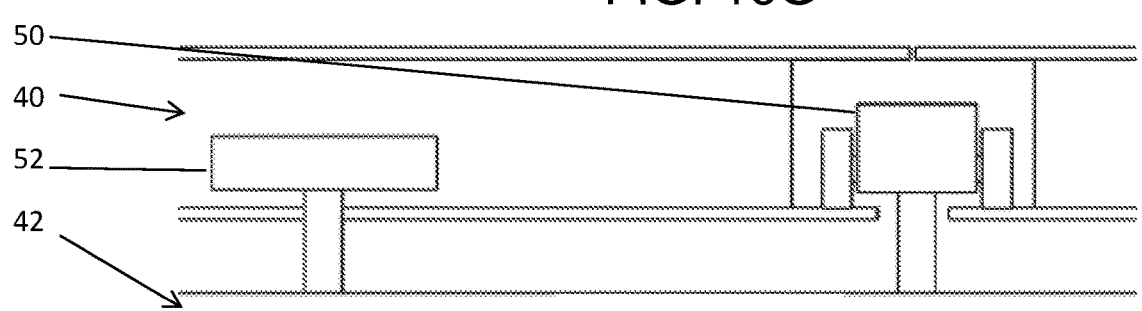
Figure 16I:
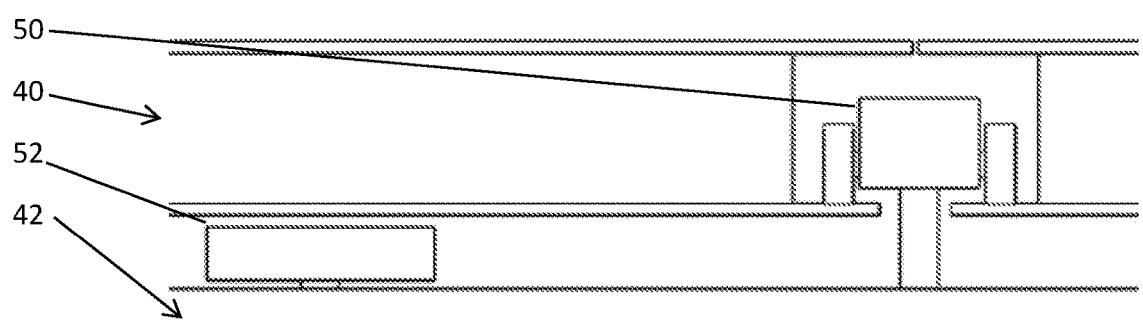

FIGS. 13, 14A-14C, 15, and 16A-16I illustrate the lifting and drive mechanisms for translating the four drive wheel modules 50, and lifting-rotating the modules 50 to affect navigation throughout the X-Y rails 40 where like numeral have the meaning ascribed to thereto with respect to the aforementioned drawings. The four drive wheel modules 50 are powered by an electric motor 66 providing drive power through a gear train 68. The electric motors are energized through line power, battery supplied electricity, or a renewable energy source in electrical communication therewith. The lift shown generally at 46 has rotational, lateral translational and vertical translational degrees of freedom imparted by gearing shown generally at 67 including worm gears, screw gears. It is appreciated that mechanical couplings to impart such motions beyond these are well known to the art and illustratively include stepper motors, hydraulics, pneumatics, and a combination thereof. The sequence of steps associated with the change of direction of a gantry 42 with respect to X-Y rails 40 are shown in FIGS. 16A-16I. From the position of the wheel module 50 and lift 52 in FIG. 16A, the lift 52 is elevated into the rail 40 (FIG. 16B) and rotated 90 degrees, while a second lift 52A position behind the wheel module 50 is rotated out of phase with lift 52 (FIG. 16C). The lifts 52 and 52A are then lowered along with the platform 42 (FIG. 16D), the platform 42 is then raised to disengage the wheel module 50 from contact with the rail 40 (FIG. 16E) and the wheel module 50 is rotated 90 degrees (FIG. 16F) and lowered to re-engage with the rail 40 (FIG. 16G), lifts 52 and 52A are rotated back to original positions as they are no longer be load bearing (FIG. 16H), and the platform is returned to the original position of FIG. 16A save for a 90 degree rotation of the wheel module 50. It should be appreciated that only one wheel module 50 is shown for visual clarity and that all four such modules and interspersed lifts are operated in concert to affect a direction change for the gantry 42 relative to the X-Y rails 40.

Automating the storing and retrieving of items in a building requires a location to store the items and a system to automatically retrieve and replace the items. Most buildings do not have storage space that is conveniently located for access by automated systems (robots, automation, etc.). The storage spaces that are available (drawers, cupboards, cabinets, closets, shelves, etc.) are usually a cluttered mess and not organized for automation. If people have access to these storage areas, they may become unusable for automatic retrieval because the items will be moved around without the knowledge of the automated system.

Figure 21:
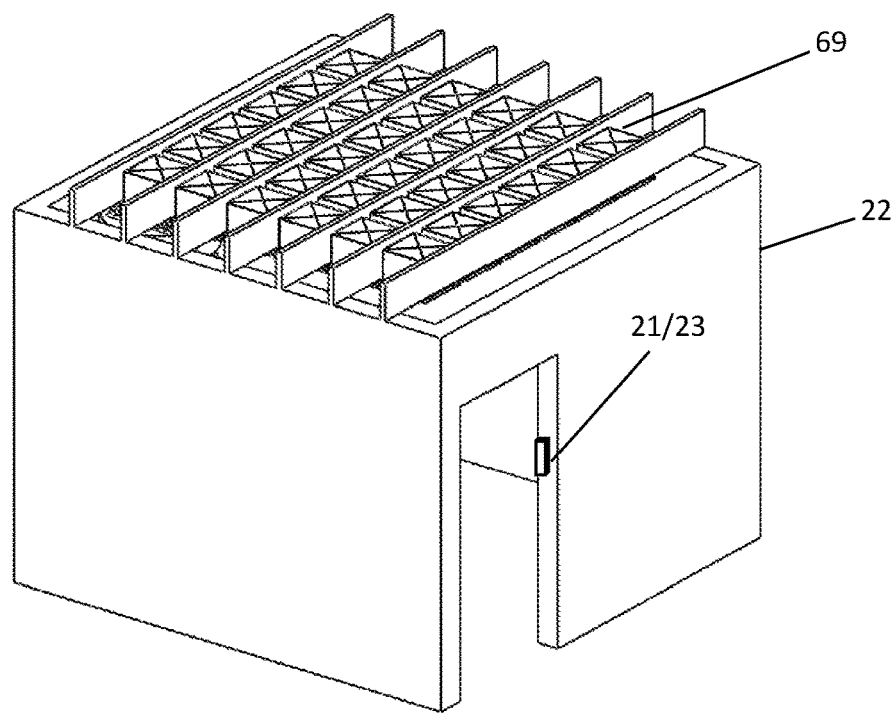
FIG. 21 is a perspective view of a ceiling storage modules.
Figure 22A:
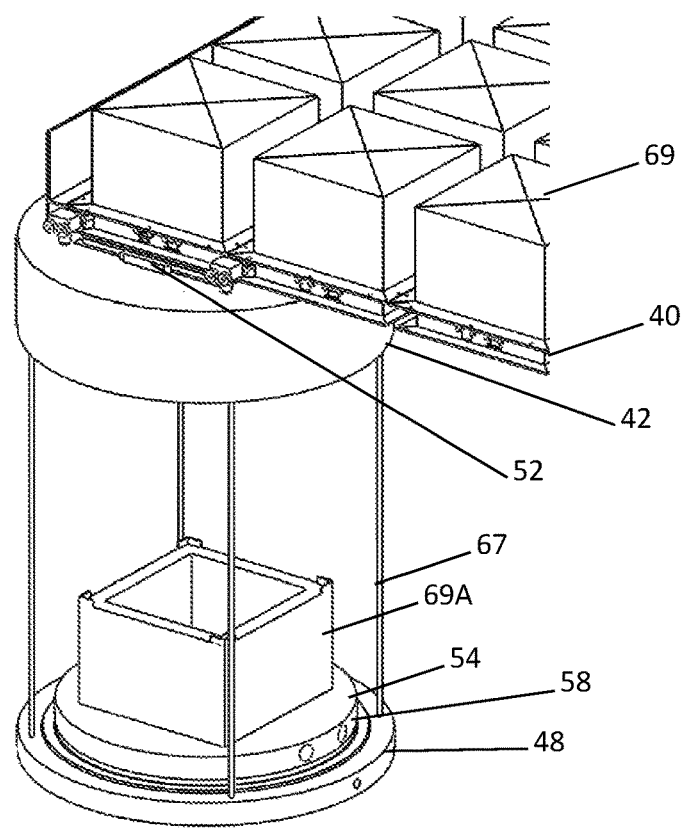
FIGS. 22A and 22B are perspective views of a platform of FIG. 20A suspended below the ceiling units of FIG. 21 with a storage module insert resting on the platform to provide access to the storage unit volume.
Figure 22B:
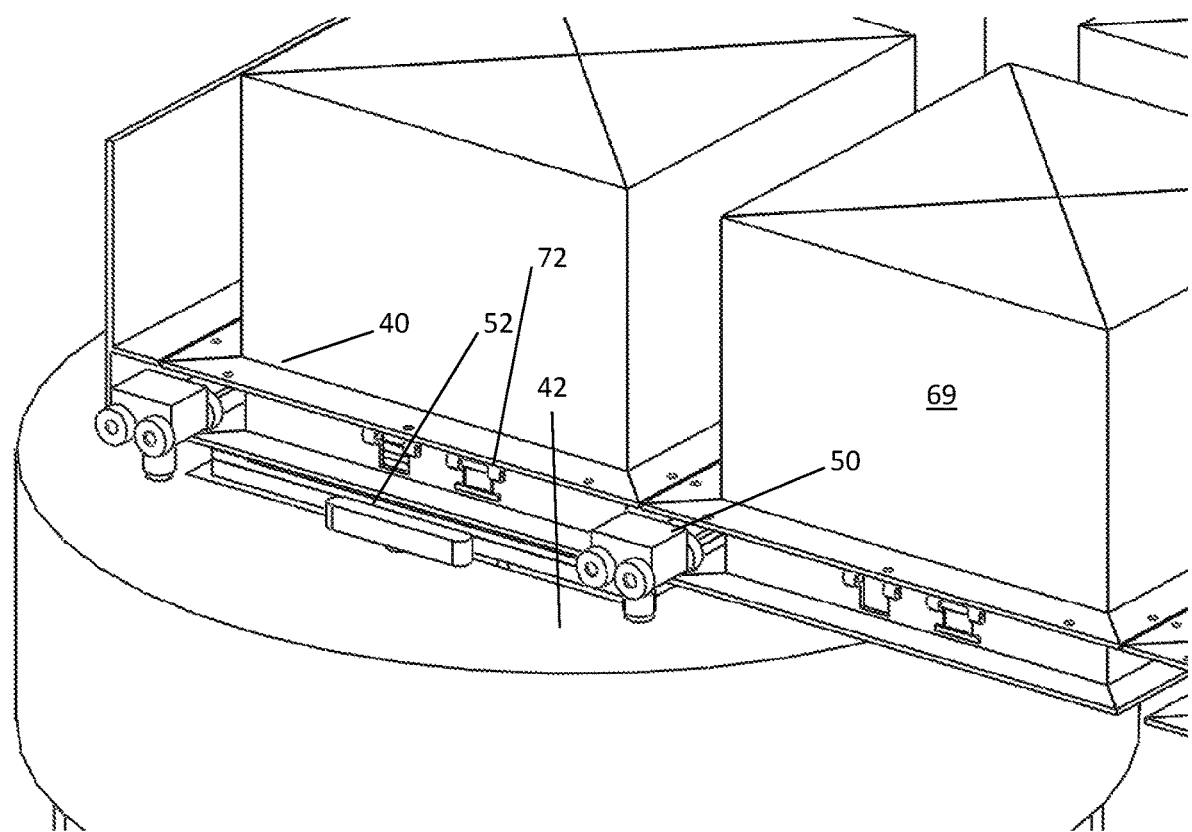
Figure 23A:
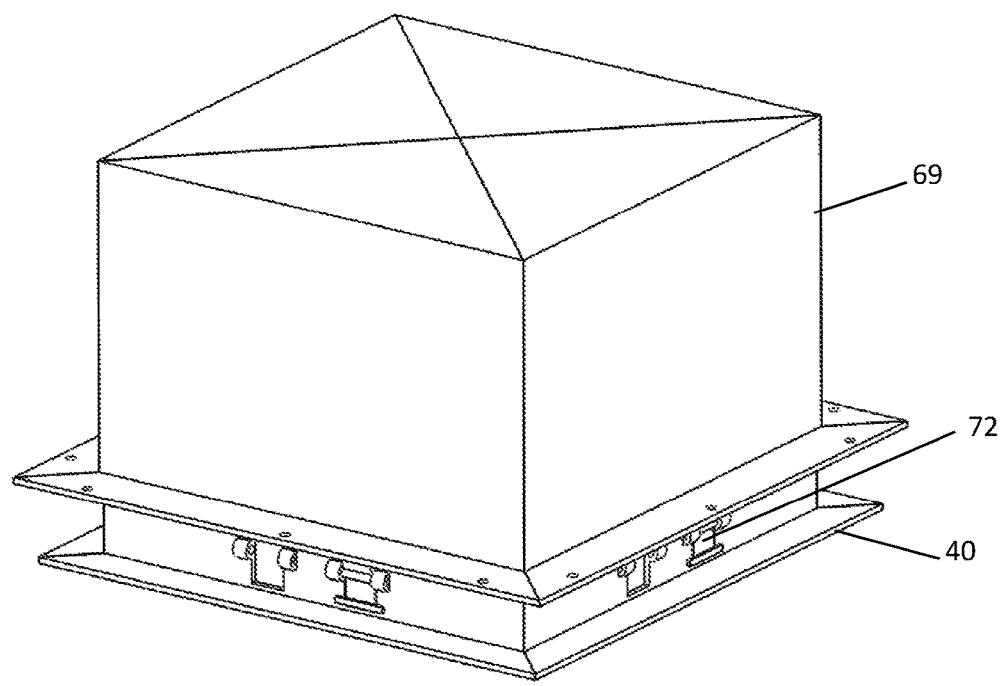
FIGS. 23A-23E are views of a storage unit as shown in FIG. 21 as a perspective view (FIG. 23A), a side view (FIG. 23B), a perspective view of the unit frame (FIG. 23C), a side view of the unit frame (FIG. 23D) and a bottom view of the unit frame (FIG. 23E)
Figure 23B:
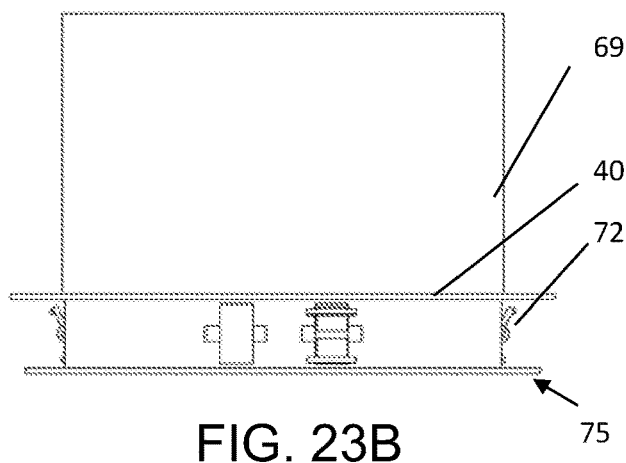
Figure 23C:
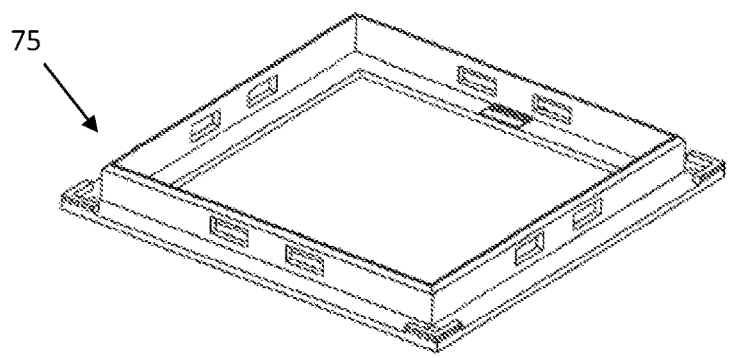
Figure 23D:
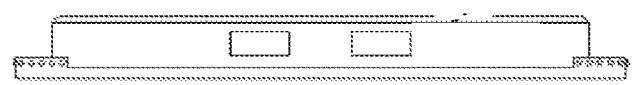
Figure 23E:
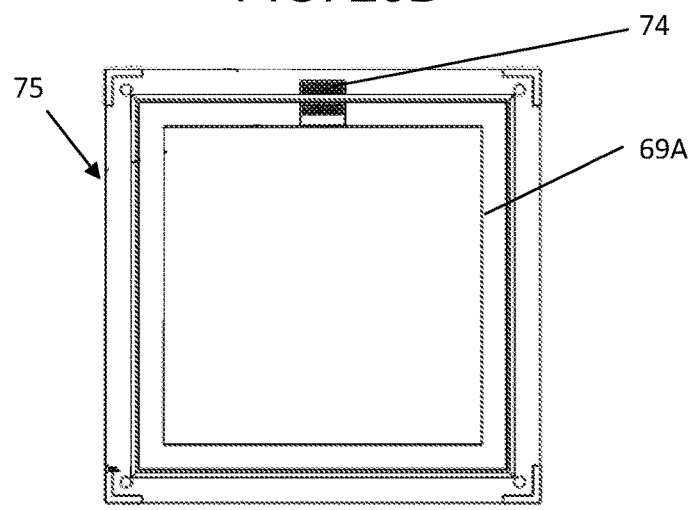
Figure 24A:
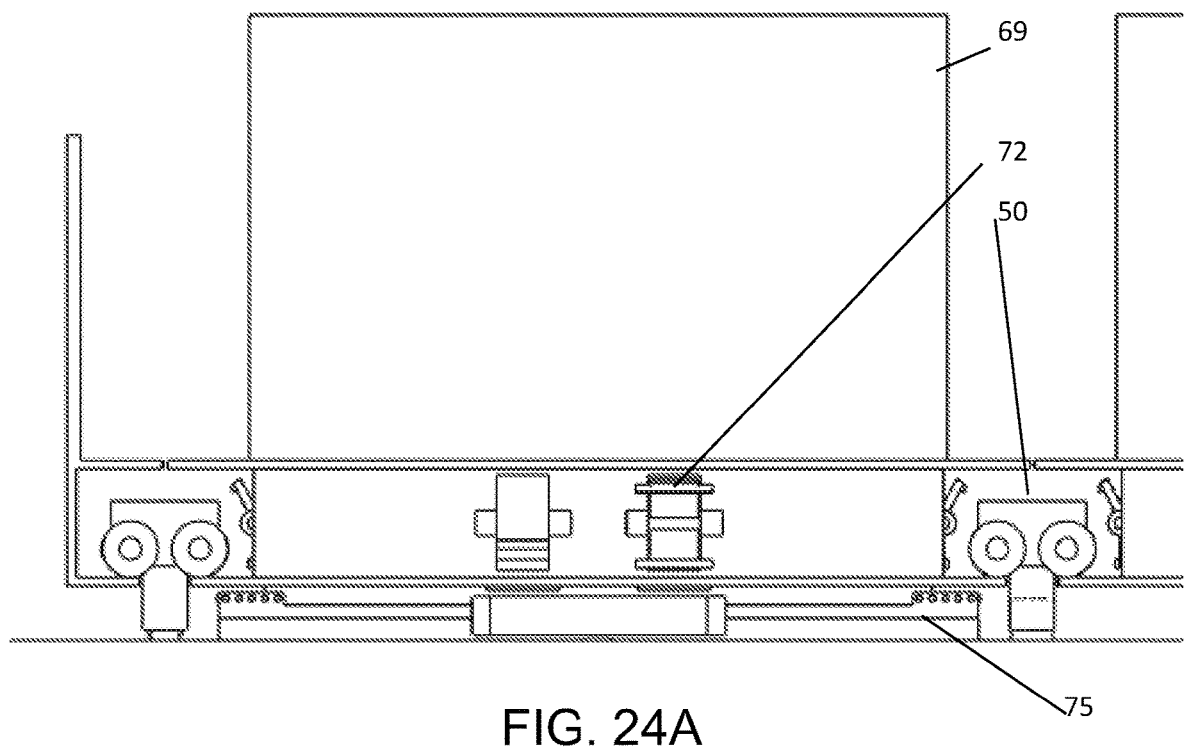
FIGS. 24A and 24B are a side view of the wheels of a platform relative to a storage unit (FIG. 24A) and a front view of the wheels of a platform relative to a storage unit (FIG. 24B)
Figure 24B:
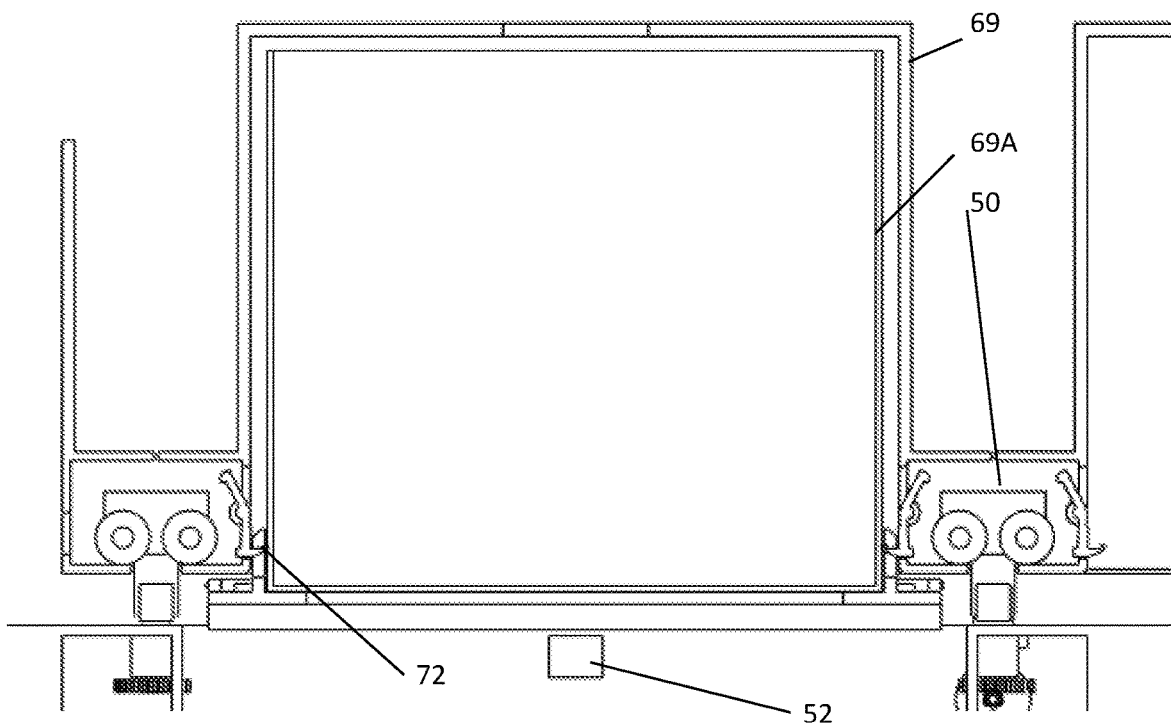
Figure 25:
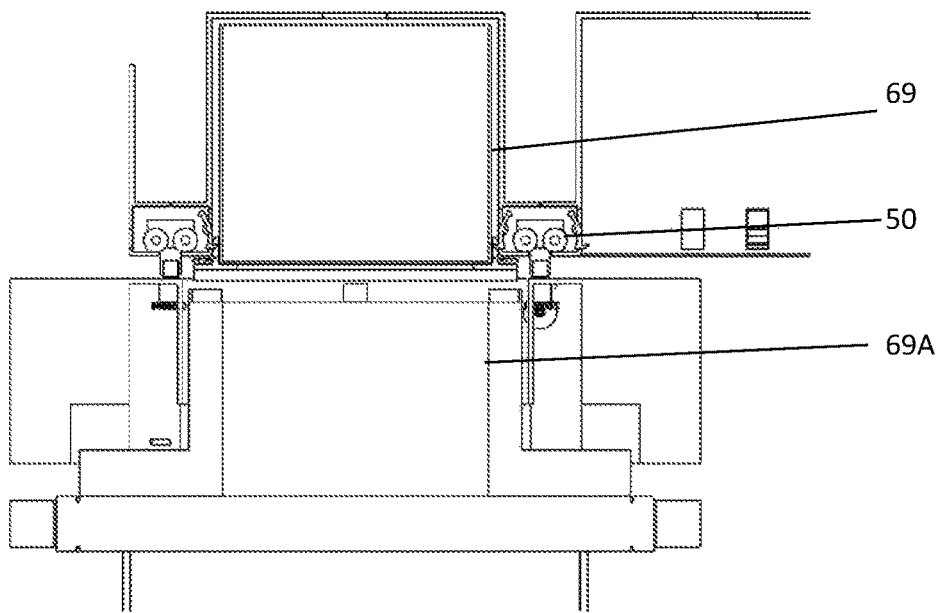
FIG. 25 is a wide front view of the of the wheels of a platform relative to a storage unit with portions of the platform extended below the storage unit.
Figure 26A:
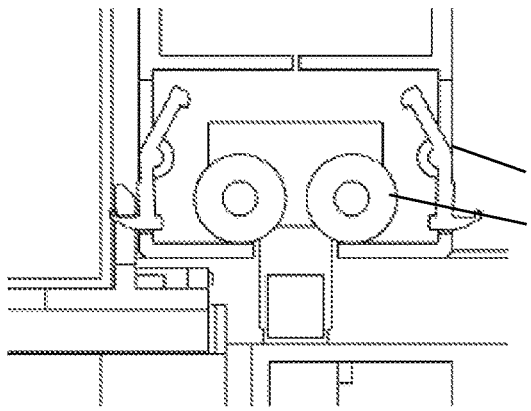
FIGS. 26A-26C are a series of sequential views of the wheel module of a platform below cosmetic panel/storage platform/module (FIG. 26A), the platform raised by cables to contact the cosmetic panel/storage platform/module (FIG. 26B), and in lift bar lift bar rotated to unlatch Latch (FIG. 26C)
Figure 26B:
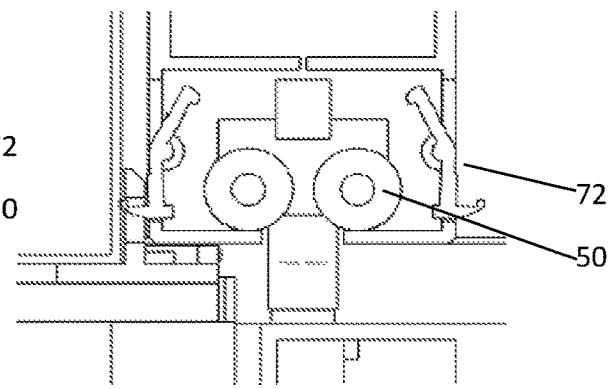
Figure 26C:
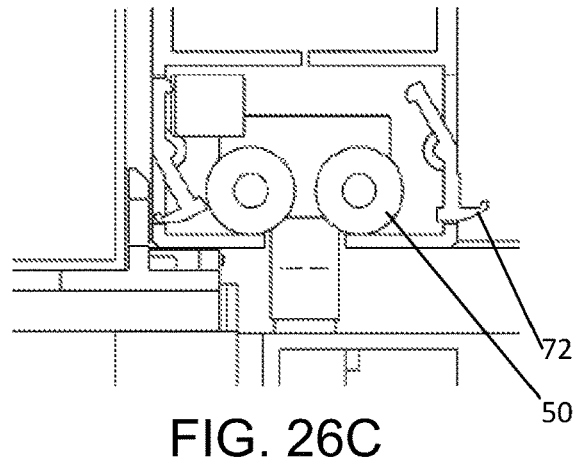
Figure 27:
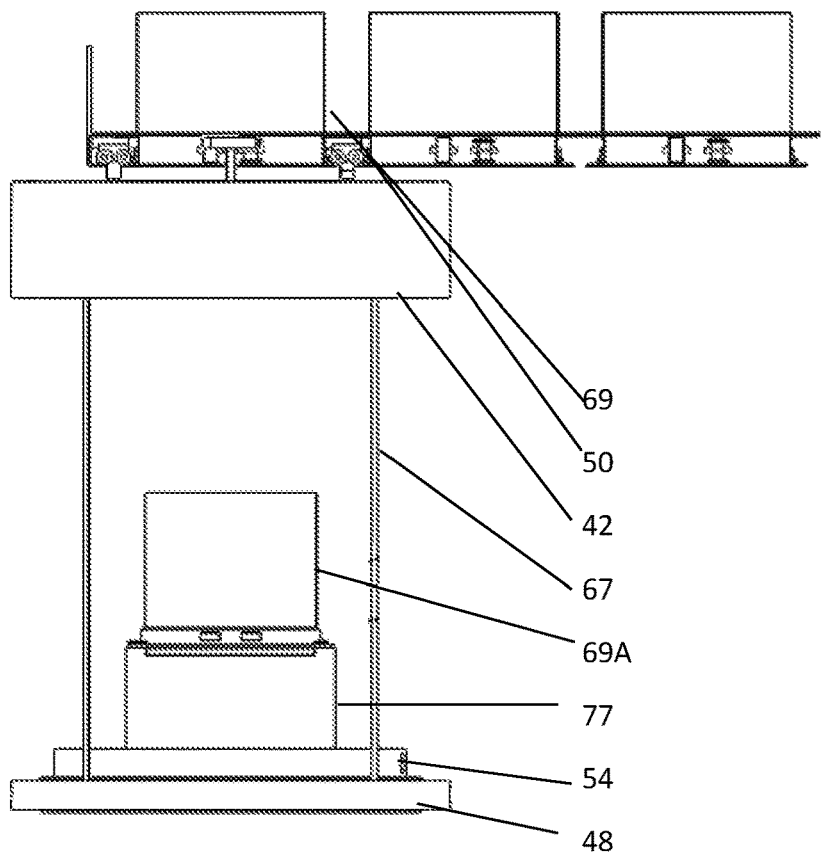
FIG. 27 is a side view of ceiling storage module with platforms B/C suspended from the cables.
Figure 28A:
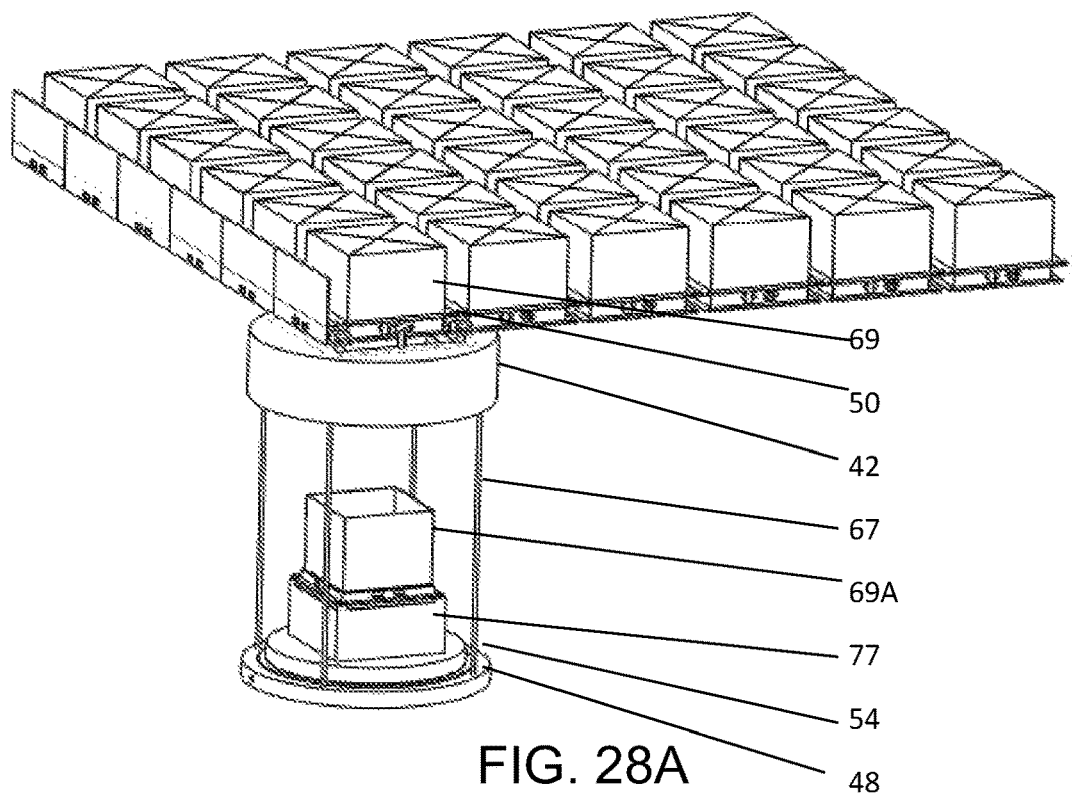
FIGS. 28A and 28B are perspective views of the system of storage modules and platforms shown in FIG. 27 (FIG. 28A) and a magnified view of the platform and wheel module (FIG. 28B)
Figure 28B:
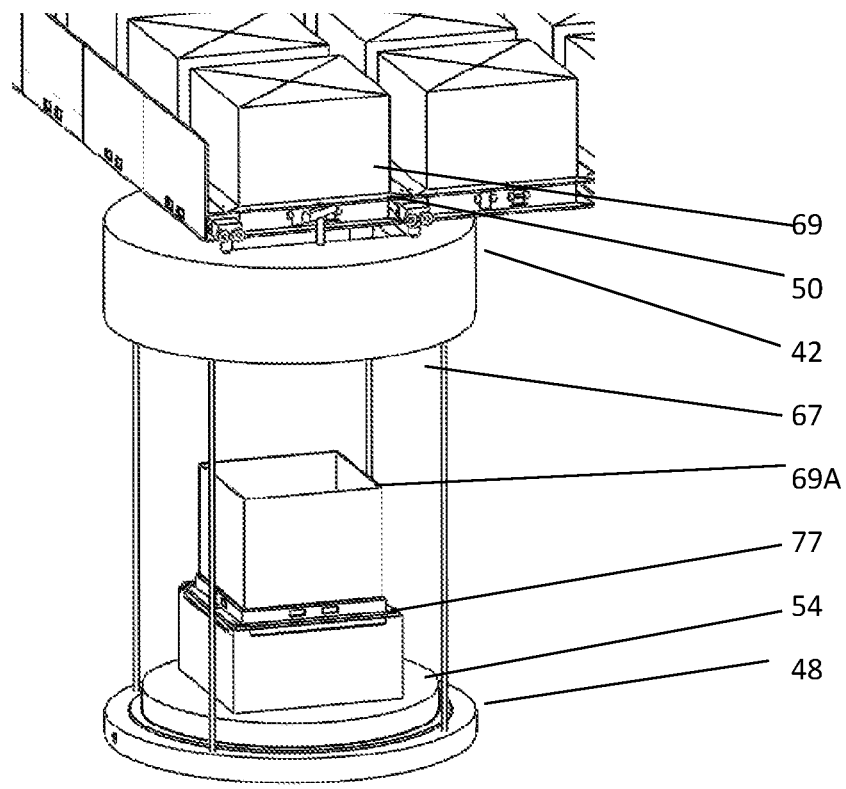
Figure 29:
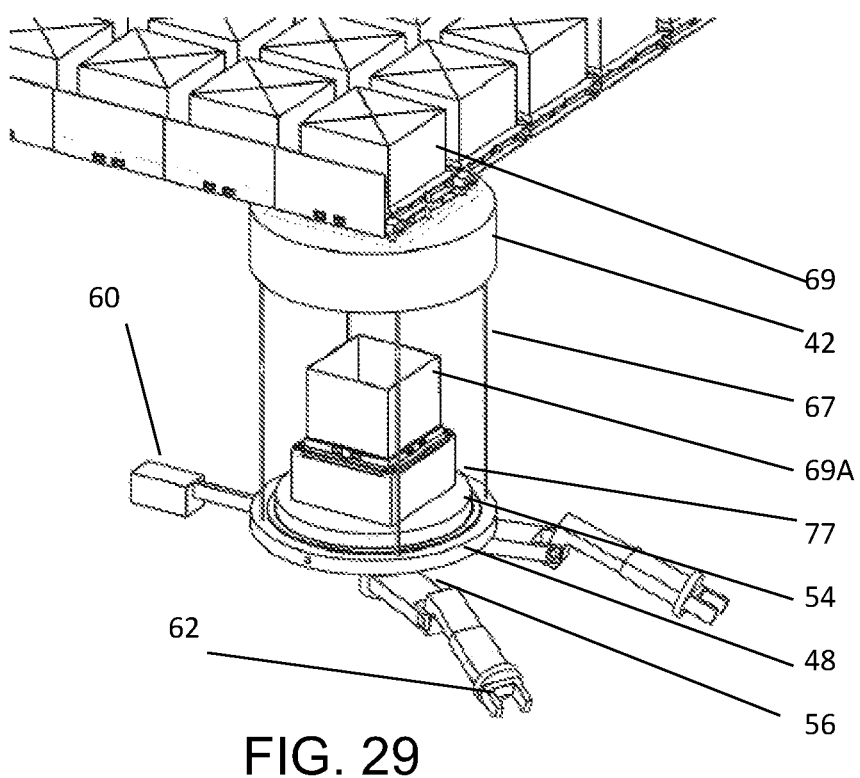
FIG. 29 is a perspective views of the system of storage modules and platforms shown in FIG. 27 with arms, cameras, and counterbalances associated with the platform.

FIGS. 21, 22A, 22B, 23A, 23B, 23C, 23D, 23E, 24A, 24B, 25, 26A, 26B, and 26C illustrate another embodiment of the present invention with storage modules present above the X-Y rails 40 where like numeral have the meaning ascribed to thereto with respect to the aforementioned drawings. An array of storage modules 69 are provided that are ceiling mounted. This is depicted with interspersed ceiling joists in FIG. 21. This is accomplished by mounted to, for example, sheet-rock, ceiling joists, or drop ceiling systems) X-Y rails 40 in each room 22 which support a motorized gantry 42 which can translate orthogonally on the X-Y rails 40. The X-Y rails 40 can supply electrical power to gantry 42. In some inventive embodiments, the array of storage modules 69 further include storage trays 79 that are stacked on one another forming a stack 76. This is depicted in in FIGS. 31A-35.

A gantry 42 contains three or more (4x) motor driven winches 46 that extend and retract cables 44 which support, raise, lower and tilt a platform B 48. Gantry also contains drive wheel modules (4x) 50 and lifts (4x) 52 which work in concert to move carriage A in orthogonal directions on the X-Y rails. Gantry 42 supplies electrical power to platform B 48.

In a specific inventive embodiment, gantry 42 contains motorized winches 46 that extend and retract cables 44 which support, raise, lower, tilt and now rotate platform B 48. Gantry 42 supplies electrical power to platform B 48 which in turn supplies power to platform 54.

Figure 30A:
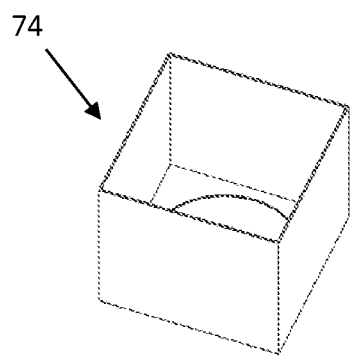
FIGS. 30A-30C are a perspective view of a cosmetic panel with an opening to accommodate module C (FIG. 30A), a perspective view of module C with a bottom opening to accommodate internal elevation (FIG. 30B) and a bottom view of module C with a bottom opening (FIG. 30C)
Figure 30B:
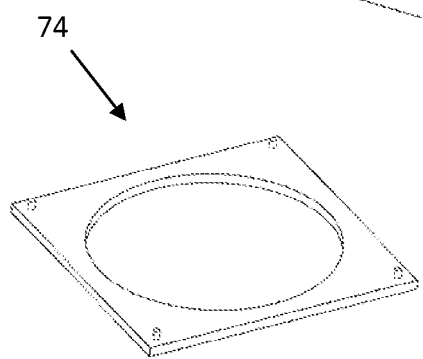
Figure 30C:
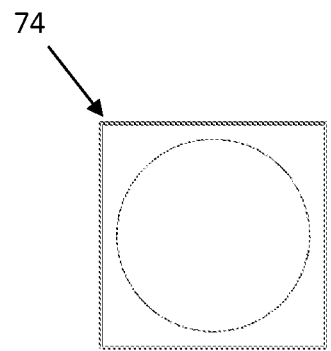
Figure 31A:
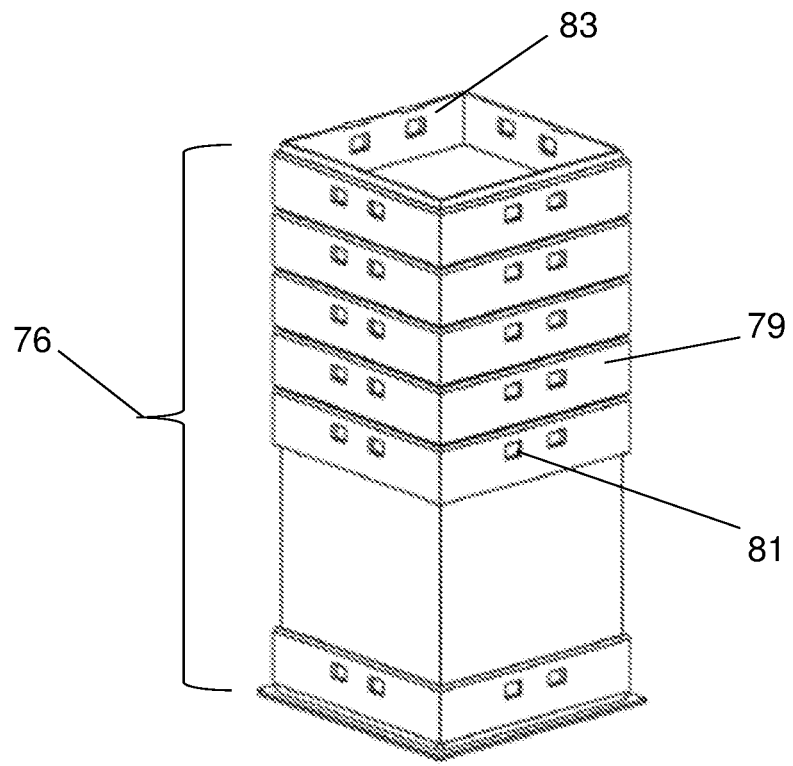
FIGS. 31A and 31B are perspective views of a stack of a plurality of storage trays according to embodiments of the invention.
Figure 31B:
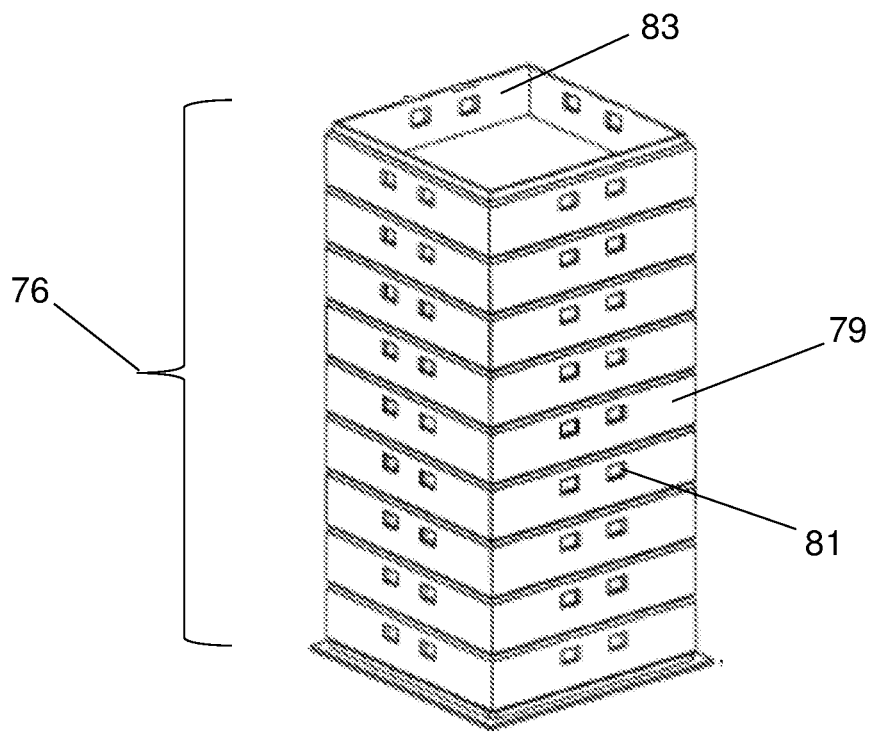
Figure 32A:
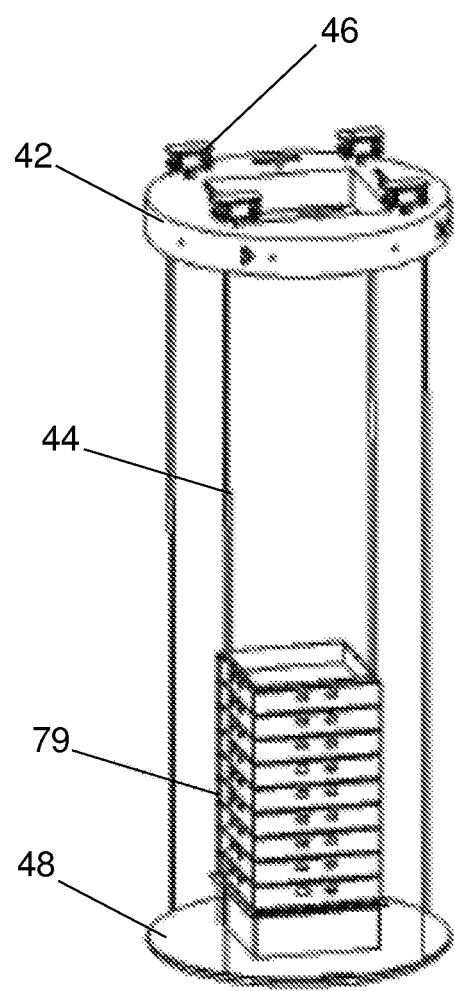
FIGS. 32A and 32B are perspective views of a stack of a plurality of storage trays on a platform suspended from the gantry according to embodiments of the invention.
Figure 32B:
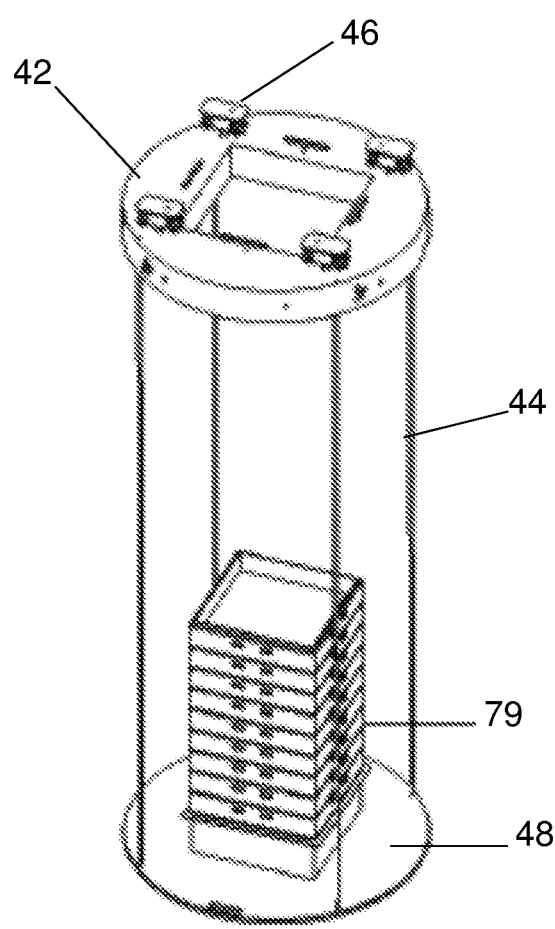
Figure 33A:
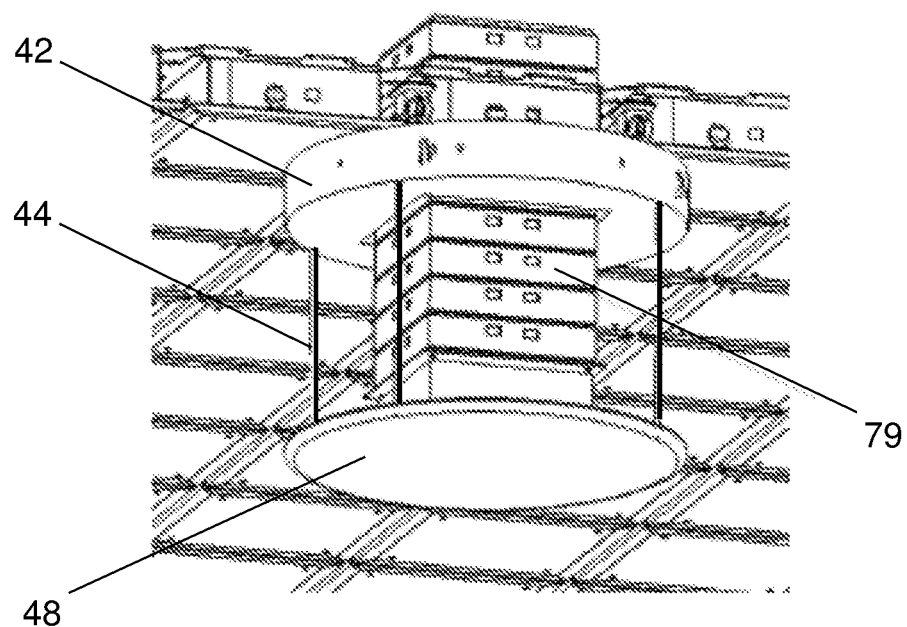
FIGS. 33A and 33B are perspective views of a stack of a plurality of storage trays being retrieved by the gantry according to embodiments of the invention.
Figure 33B:
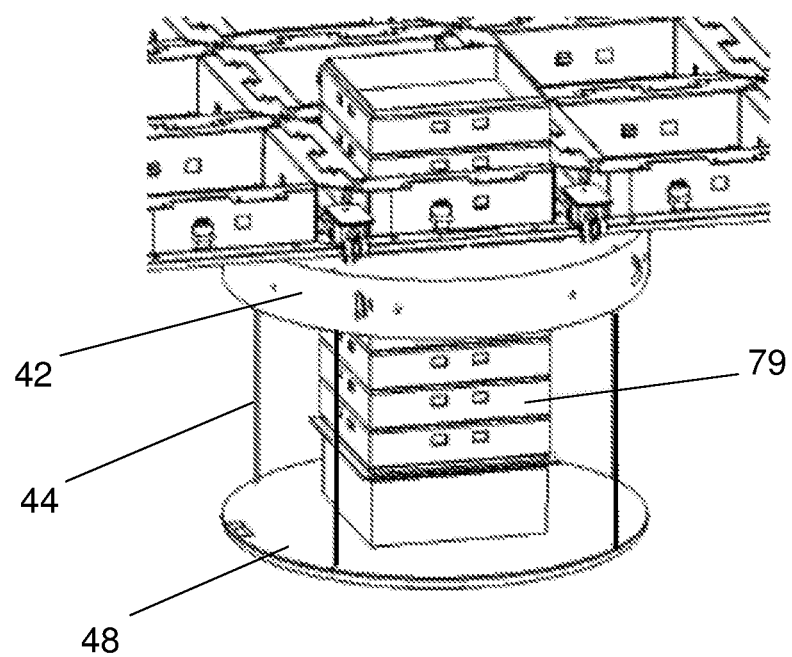
Figure 34A:
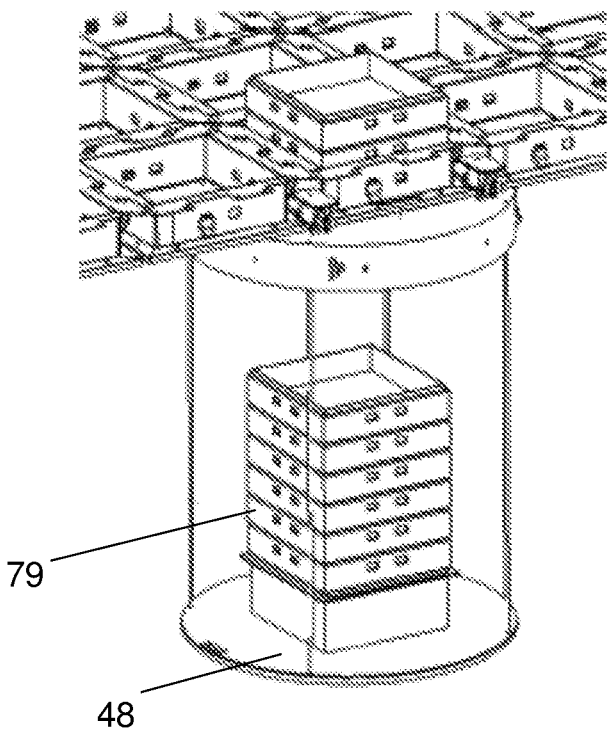
FIGS. 34A and 34B are perspective views of a retrieved stack of a plurality of storage trays being lowered on a platform suspended by the gantry according to embodiments of the invention.
Figure 34B:
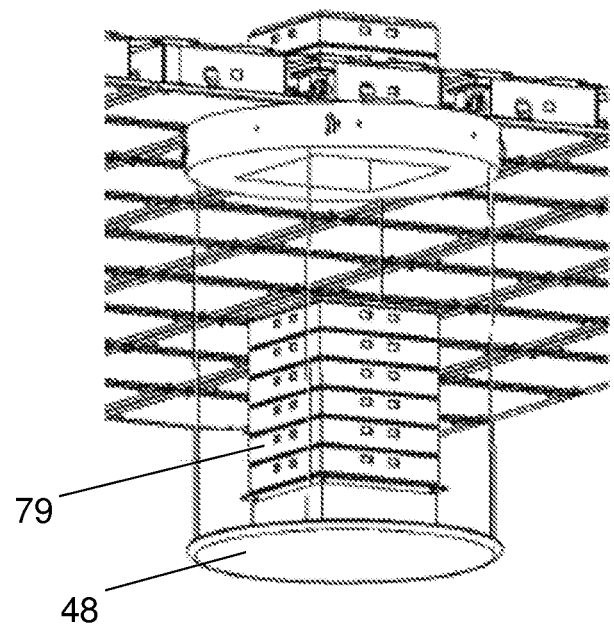

A set of latches 72 provides selective access to the storage modules 69 or a storage tray 79 from a stack 76 with engagement of the latches 72 with a set of engagement features illustratively including slots 81 in the walls 83 of the storage tray 79. A mechanical/electrical interface 74 is provided between the storage module 69 and a cosmetic panel 75, as best illustrated in FIGS. 23A-23E. A cosmetic panel 75 and a bottom surface of a storage module 69 or lower portion 69A thereof are amenable to surface treatment such as painting or texturing for aesthetic reasons to create a ceiling having a desired appearance. Cosmetic panels 75 can be acoustic tiles, 3-D sculptures, video displays, foam, glass, wood, metal, plastic, lights, IR heaters, or a combination thereof. FIGS. 30A-30C illustrate a lower portion 69A with a circular central door omitted for visual clarity or a cosmetic panel 75 with such an opening.

As a result, the volume above, between and below the X-Y rails 40, as well as the space between the ceiling joists is used to store modules 69 and stackable storage trays 79 in a controlled storage location for automated retrieval and replacement. The modules 69 illustratively have within them storage units, storage bins, storage shelves, tables, robots, games, displays, refrigerators, freezers, ovens, microwaves, humidors, fire extinguishers, wine racks, lights, cameras, speakers, audio and video components, displays, smoke detectors/alarms, sensors, electronic equipment, dishwashers, vacuum cleaners, air purifying systems, air heating and cooling systems, charging stations, or a combination thereof. It is appreciated that the rails can form a variety of shapes and sizes to accommodate storage modules 69 that are of a variety of shapes and sizes such as cuboidal or hemispherical volumes. It is further appreciated that the rails can also accommodate a variety of configurations of the storage modules 69, illustratively including a stack 76 of storage trays 79. The storage modules 69 can be accessed robotically via the platform 48 suspended by the gantry 42, robotic arms 56 or manually. A storage module 69 as depicted has an inserted and inverted inner portion 69A with a top opening that is complementary to module 69 to form a closed unit. It is appreciated that the inner portion 69A is a removable floor, a tray, or having sidewalls that extend to an extreme of contacting an upper surface of the module 69. It is appreciated that the entire contents of a module 69 are delivered to a user or an article is accessed, the storage module 69 closed, and only the desired article delivered. A pencil box and refrigerated items being exemplary of the former and the latter, respectively. It is further appreciated that in some inventive embodiments, a particular storage tray 79 that is part of a stack 76 is selectively retrieved and delivered to a user, or an article accessed therefrom is delivered to a user.

A controller 21 provides a human user interface 23 that is a display, touch screen, auditory, or a joystick receives user input as to the desired articles from storage, the location of delivery and the scheduling of delivery. The controller 21 has access to a database inventory of articles stored in the storage modules 69, or to be stored in the modules. The controller then instructs the movement of the gantry 42 to retrieve or store articles and any desired manipulation of the robotic arms 56.

A sequence of latch 72 manipulations to access a storage module 69 or a stack 76 of storage trays 79 and secure the same in the context of the present invention are illustrated in FIGS. 24A, 24B, 25, 26A, 26B, 26C, 33A, 33B, 34A, and 34B. The various latch positions and access to the volume of a storage module 69 or stack 76 of storage trays 79 are shown.

FIGS. 27, 28A, 28B, and 29 illustrate an embodiment of the present invention in which a module 77 is present on platform 48. FIGS. 32A-35 illustrate an embodiment of the present invention in which a stack 76 of storage trays 79 is present on platform 48. A door/opening in the storage portion 69A and/or cosmetic panel 75 enable a sub-platform to be lowered into contact and optionally electrical communication with module 77. As a result the contents of a given storage module 69 can be manipulated in all three dimensions as defined by the extent of a rail system 40, and accessed manually or robotically. With module 77 containing additional functionality such as an electric power source to operate an article such as an appliance, a scale to weigh contents of a storage module 69, or other such functionality a variety of manual operations are amenable to automation. By way of example if storage modules are laboratory animal cages or terrariums, the occupants of each module 69 are monitored and supplied by way of an inventive system in an automated way by a local or remote user. In still another example, food stuffs are retrieved from storage, prepared, served, then used utensils are cleaned and removed by an inventive system.

Figure 35:
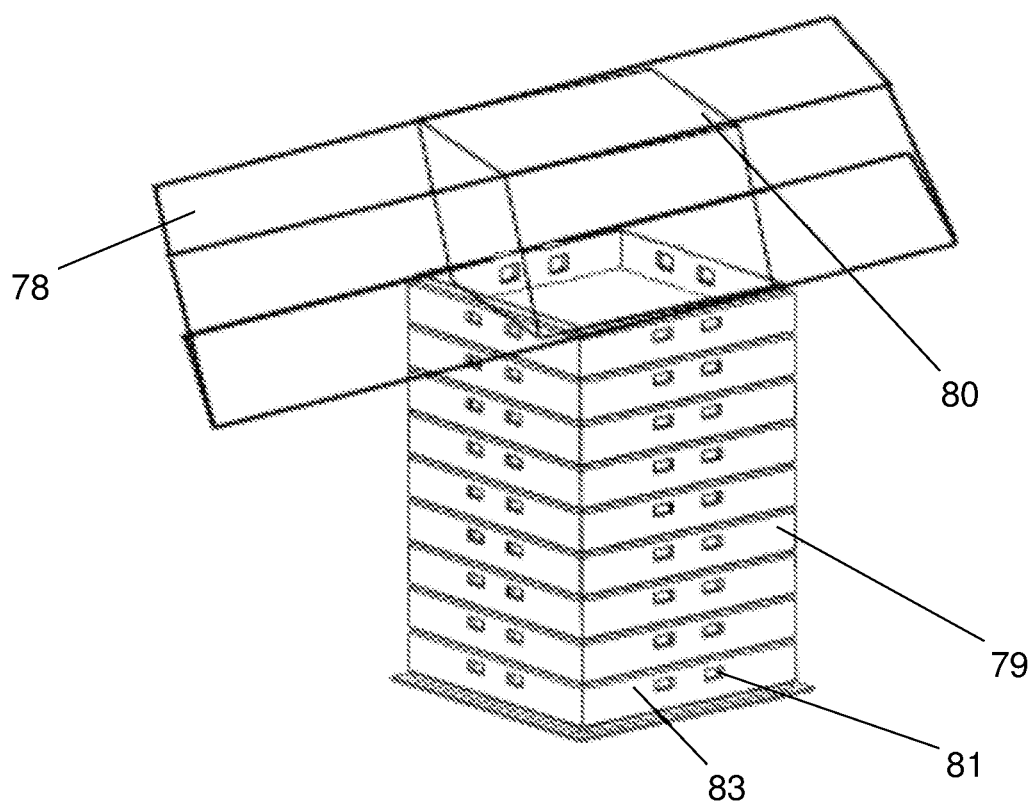
FIG. 35 is a perspective view of one storage module with a stack of storage trays accessible from a roof of a building through a hatch in the roof shown in transparent view.

As illustrated in FIG. 35, in some inventive embodiments one storage module 69 with a stack 76 of storage trays 79 is accessible from a roof 78 through a hatch 80 in the roof 78. It is appreciated that an article is deposited through the hatch 80 from the roof 78 and collected to be stored in the storage tray 79. Articles deposited through and collected via the hatch 80 illustratively include mail parcels, food, medicine, and the like. It is further appreciated that in some inventive embodiments, an article stored in the storage module 69 or storage tray 79 is collected via the hatch 80 and transported away from the building by a variety of mechanisms and technologies known in the art, illustratively including by drone. Items that are collected via the hatch 80 and transported away from the building illustratively include garbage, recycling, and outgoing mail parcels.

It is appreciated that a variety of sensors, video displays, speakers and microphones on the X-Y rails, translation platforms, storage platforms, cosmetic panels or a combination thereof. As a result, a tele-presence is created that allows for more complex control and operational feedback. It is also appreciated that any platform or module detailed herein may contain batteries to serve as a main or backup power source for an inventive system or stored article.

The foregoing description is illustrative of particular embodiments of the invention, but is not meant to be a limitation upon the practice thereof. The following claims, including all equivalents thereof, are intended to define the scope of the invention.

The invention claimed is:

1. A suspended automation system comprising:
a rail array secured to a ceiling;
a gantry;
a drive mechanism coupled to said gantry for transit of said gantry in an area of said rail array;
a platform suspended from said gantry; and
a plurality of storage trays each with a set of walls with engagement features in said walls, said engagement features adapted to engage with a set of latches for selective retrieval of said plurality of storage trays, said plurality of storage trays located above said rail array, each of said plurality of storage trays having a volume for storage of an article and positioned within cells of said rail array, and at least two of said plurality of storage trays stacked on one another forming a stack.

2. The system of claim 1 wherein one or more of the storage trays of said stack is accessible from a roof through a hatch in said roof or from a wall through a door in said wall.

3. The system of claim 1 wherein said drive mechanism includes interspersed powered wheel modules and lifters.

4. The system of claim 3 wherein said lifters are adjustable in a Z direction and said wheel modules are pivotable between X and Y directions on said rail array.

5. The system of claim 1 wherein said gantry is automatically transferrable to a second rail array.

6. The system of claim 1 further comprising one or more robotic arms suspended from said platform.

7. The system of claim 6 further comprising one or more counter-balances to said one or more robotic arms.

8. The system of claim 1 further comprising one or more cameras suspended from said platform.

9. The system of claim 1 further comprising one or more sensors associated with said rail array, said gantry, or said platform.

10. The system of claim 1 further comprising cables between said gantry and platform, said cables being retracted with winches in said gantry to raise said platform.

11. The system of claim 1 further comprising a gantry pivot for rotating said gantry.

12. The system of claim 1 further comprising a motorized platform pivotably mounted to said platform.

13. The system of claim 1 further comprising a human user interface, where said user interface is a display, touch screen tablet, auditory, smart phone, or a joystick.

14. The system of claim 1 wherein the ceiling is part of a room or trellis.

15. A process of performing an operation in a room area comprising operating a system of claim 1.

16. The system of claim 1 wherein said engagement features in said walls of said storage trays are a set of slots adapted to engage with said latches.

17. A process of retrieving an article in a room area comprising:

storing the article in a system having a rail array secured to a ceiling, a gantry, a drive mechanism coupled to said gantry for transit of said gantry in an area of said rail array, a platform suspended from said gantry, a controller with a human user interface for selectively moving said gantry, and a plurality of stacked storage trays with a set of walls with engagement features in said walls located above said rail array, each of said plurality of stacked storage trays having a volume for storage of the article and positioned within cells of said rail array;

requesting the article via the user interface;

allowing sufficient time for said gantry to translate to a stack of said plurality of stacked storage trays, one of said plurality of stacked storage trays therein containing the article;

retrieving said one of said plurality of stacked storage trays containing the article by engagement/disengagement with a set of latches with said engagement features in said walls of said one of said plurality of stacked storage trays; and lowering the article in the tray and optionally moving the article to a user selected delivery point for retrieving the article in the room area.

18. The process of claim 17 wherein the delivery point is a transfer point for said gantry to a second area.

19. The process of claim 17 wherein the article is further manipulated by robotic arms associated with said platform prior to the delivery point.

20. The process of claim 17 wherein the article is collected through a hatch in a roof accessible by one of the stacked storage trays or from a wall through a door in said wall.

* * * * *